US011361318B2

(12) United States Patent
Pitz et al.

(10) Patent No.: US 11,361,318 B2
(45) Date of Patent: Jun. 14, 2022

(54) METHODS AND SYSTEM FOR REAL-TIME FRAUD DECISIONING BASED UPON USER-DEFINED VALID ACTIVITY LOCATION DATA

(71) Applicant: MASTERCARD INTERNATIONAL INCORPORATED, Purchase, NY (US)

(72) Inventors: Cindi Pitz, Stormville, NY (US); Roopa Vaidya, Elmsford, NY (US); Michael Cardamone, New Windsor, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/733,307

(22) Filed: Jan. 3, 2020

(65) Prior Publication Data
US 2020/0143374 A1    May 7, 2020

Related U.S. Application Data

(62) Division of application No. 15/181,982, filed on Jun. 14, 2016, now Pat. No. 10,565,589.

(51) Int. Cl.
*G06Q 20/40* (2012.01)
*G06F 21/30* (2013.01)
(Continued)

(52) U.S. Cl.
CPC ........... *G06Q 20/401* (2013.01); *G06F 3/147* (2013.01); *G06F 21/30* (2013.01); *G06F 21/31* (2013.01);
(Continued)

(58) Field of Classification Search
CPC .................. G06Q 20/401; G06Q 20/3224
(Continued)

(56) References Cited

U.S. PATENT DOCUMENTS 6,636,833 B1   10/2003   Flitcroft et al.
7,136,835 B1   11/2006   Flitcroft et al.
(Continued)

OTHER PUBLICATIONS

PCT/US2017/037184, Notification of Transmittal of the International Search Report and the Written Opinion dated Sep. 21, 2017, 13 pages.

*Primary Examiner* — Robert R Niquette
(74) *Attorney, Agent, or Firm* — Buchanan Ingersoll & Rooney PC

(57) ABSTRACT

A computer-implemented method for real-time fraudulent activity verification, comprising: displaying, on a user device, a first notification which prompts entry of a user-selected geographic area, the user-selected geographic area defining a valid region for processing of transactions associated with a user; receiving, by the user device, user-defined geographic data, the user-defined geographic data specifying at least one user-selected geographic area and defining the valid region for processing of transactions; transmitting, by the user device, the user-defined geographic data along with user data, the user data identifying the user device or the user; receiving, the user device, a second notification, the second notification being an authentication request message received in response to a proposed transaction associated with a user identifier related to the user; displaying, by the user device, the second notification; receiving, by the user device, user-provided authentication data; and transmitting, by the user device, the user-provided authentication data.

6 Claims, 13 Drawing Sheets

(51) Int. Cl.
  *G06F 21/31* (2013.01)
  *G06Q 20/32* (2012.01)
  *H04W 4/021* (2018.01)
  *H04W 12/06* (2021.01)
  *H04W 12/12* (2021.01)
  *H04W 64/00* (2009.01)
  *G09G 5/377* (2006.01)
  *G06F 3/147* (2006.01)
  *H04L 9/40* (2022.01)

(52) U.S. Cl.
  CPC ......... *G06Q 20/3224* (2013.01); *G09G 5/377* (2013.01); *H04L 63/0492* (2013.01); *H04L 63/08* (2013.01); *H04W 4/021* (2013.01); *H04W 12/06* (2013.01); *H04W 12/12* (2013.01); *H04W 64/00* (2013.01); *G06F 2221/2111* (2013.01)

(58) Field of Classification Search
  USPC ..................................................... 705/35–45
  See application file for complete search history.

(56) References Cited

U.S. PATENT DOCUMENTS

| | | | |
|---|---|---|---|
| 7,428,509 B2 | 9/2008 | Klebanoff et al. | |
| 7,567,934 B2 | 7/2009 | Flitcroft et al. | |
| 7,571,142 B1 | 8/2009 | Flitcroft et al. | |
| 7,593,896 B1 | 9/2009 | Flitcroft et al. | |
| 8,459,546 B1 | 6/2013 | Block et al. | |
| 8,676,707 B2 | 3/2014 | Flitcroft et al. | |
| 8,756,150 B2 | 6/2014 | Flitcroft et al. | |
| 8,793,188 B2 | 7/2014 | Larkin et al. | |
| 2003/0182194 A1* | 9/2003 | Choey | G06Q 20/32 705/16 |
| 2009/0070260 A1 | 3/2009 | Flitcroft et al. | |
| 2010/0022254 A1 | 1/2010 | Ashfield et al. | |
| 2010/0138345 A1* | 6/2010 | Lekhtman | G06Q 20/3224 705/44 |
| 2010/0312636 A1 | 12/2010 | Coulter et al. | |
| 2011/0035318 A1 | 2/2011 | Hargrove et al. | |
| 2011/0202460 A1 | 8/2011 | Buer et al. | |
| 2011/0202461 A1 | 8/2011 | Lundgren et al. | |
| 2011/0276489 A1* | 11/2011 | Larkin | G06Q 20/42 705/44 |
| 2012/0173429 A1 | 7/2012 | Stevens | |
| 2014/0122336 A1 | 5/2014 | Jeremy et al. | |
| 2015/0106268 A1* | 4/2015 | Carroll | H04W 12/126 705/44 |
| 2015/0170149 A1 | 6/2015 | Sharma et al. | |
| 2015/0235220 A1 | 8/2015 | Murphy et al. | |
| 2016/0086155 A1 | 3/2016 | Candelore et al. | |
| 2016/0132851 A1 | 5/2016 | Desai et al. | |
| 2016/0180344 A1 | 6/2016 | Studnicka et al. | |
| 2016/0364716 A1 | 12/2016 | Bakshi et al. | |
| 2017/0083913 A1 | 3/2017 | Matthews | |
| 2017/0091765 A1 | 3/2017 | Lloyd et al. | |
| 2018/0068309 A1 | 3/2018 | Mahaffey et al. | |
| 2020/0143374 A1* | 5/2020 | Pitz | G09G 5/377 |

\* cited by examiner

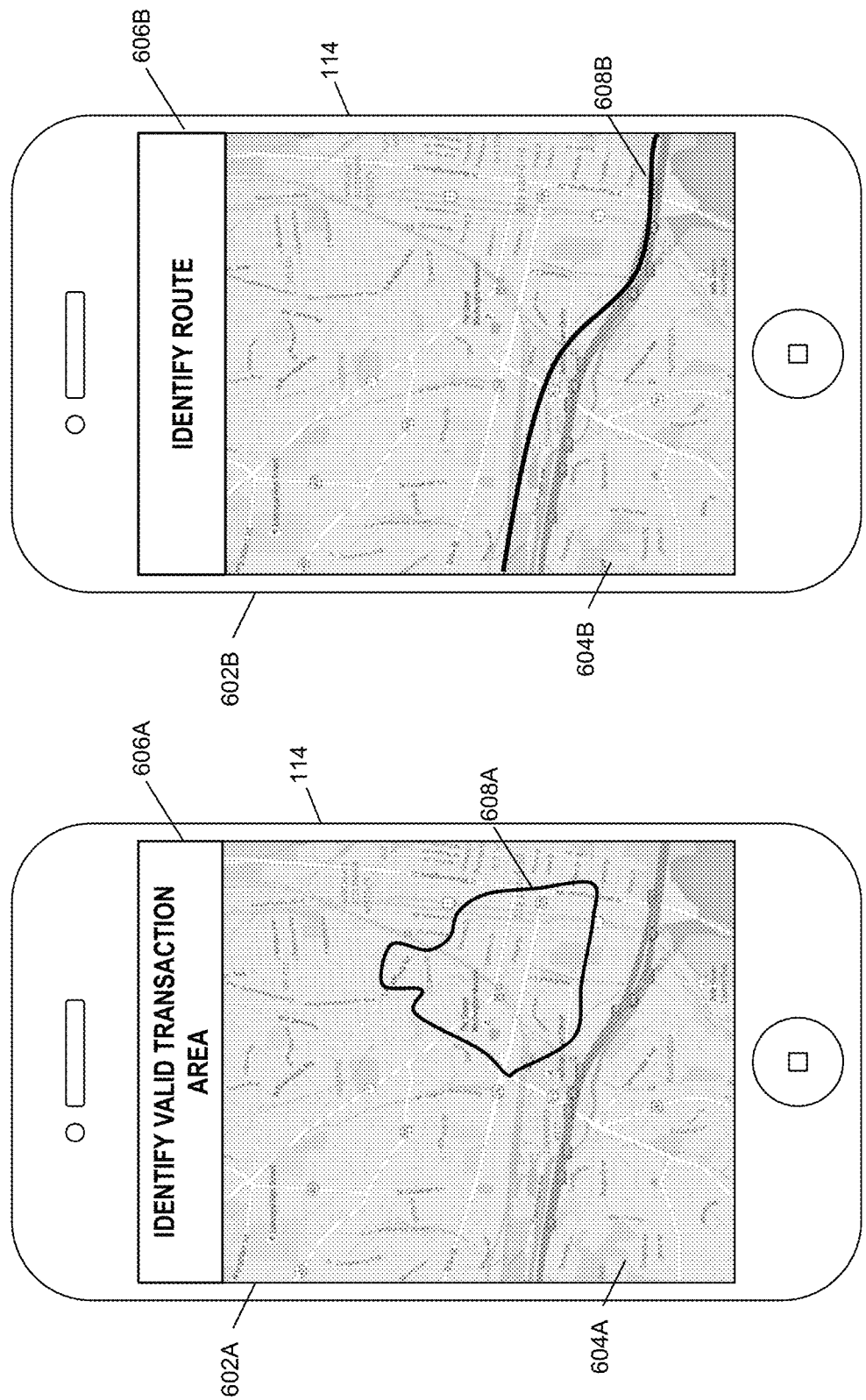

METHODS AND SYSTEM FOR REAL-TIME FRAUD DECISIONING BASED UPON USER-DEFINED VALID ACTIVITY LOCATION DATA

FIELD

The present disclosure relates to real-time fraud decisioning in transaction processing, real time alerts for fraud notification, and tracking and identification of fraudulent activity.

BACKGROUND

In recent years, the use of payment cards and other cash-substitute payment instruments associated with transaction accounts has increased. Accompanying the increase in use of such payment means is a rise in fraudulent transaction attempts, many of which are successful. In an effort to combat fraudulent transactions, various methods have been developed for the identification and prevention of fraudulent transaction processing.

Fraudulent transactions may be identified based upon a number of factors: the location from which a transaction request originates, the amount of transactions that have been conducted by a payment instrument within a certain period of time, etc. For instance, when a card is used in a geographic location where a cardholder is unlikely to be located, a transaction may be flagged as fraudulent and thus, the transaction may be declined. Unfortunately, many times transactions in such geographic locations may, in fact, be authentic; however, the transaction may be flagged as fraudulent resulting in an unnecessary decline of transaction processing. In the past, it was often necessary for a cardholder to telephone a card account issuing bank to advise them of upcoming travel dates to hopefully avoid the unnecessary declination of transaction processing for the cardholder while in an unusual geographic location. Such methods are ineffective and inefficient as travel plans for an individual often change and call centers are not always available to take a call from a cardholder and update a card processing system accordingly. Additionally, such methods allow for multiple instances of human error to occur even if proper travel dates and locations are provided (e.g., by the cardholder, the call center, etc.), lack flexibility, and do not allow for precise anticipated location parameters.

Inaccurately identified fraudulent transaction processing significantly impact electronic transaction processing systems as well as the parties involved with such systems. For example, a transaction request mistakenly identified as fraudulent may require multiple communications between a cardholder and a card processor to resolve and once resolved, will require additional transaction system resources to initiate and process a second transaction, resulting in unnecessary traffic within the electronic transaction processing system. In some instances, misidentification of fraudulent transaction activity may result in the cancellation of a card and may require reissuance of a card and reconfiguration of cardholder account characteristics within an issuer's computer system.

In addition to the system burdens experienced by the electronic transaction processing system, cardholders, merchants, acquirers and issuers are each impacted by falsely identified fraudulent activity. An issuer may be impacted due to lost transactions that would have otherwise been made. The merchant and/or acquirer will be impacted by such lost transactions as well and the cost associated with attempts to authorize declined transactions. The cardholder will be impacted by the increased time, hassle, and possible expense, associated with correcting the inaccurately identified fraudulent transaction.

On the other hand, in many cases activity which is in fact fraudulent may be authenticated by transaction processing systems. For instance, a cardholder's card may be used by an unauthorized party at a merchant and an authorization may be sent by the merchant device to the card processing network. The merchant device may include an identifier associated with a location lying within a geographic area in which a cardholder has recently conducted an authentic transaction or an area in which a cardholder often uses the card. In the past, in such a circumstance, the fraudulent transaction attempt would likely be authenticated.

Further, oftentimes fraudulent activity determinations are made without taking into account decisions of a fraud engine or accounting for possible inaccurate decision making output by a similar type of system and are focused upon the receipt of explicit notification from a cardholder that a card should be blocked or prevented from further use. See, for instance, in U.S. Pat. No. 8,793,188.

In accordance with the above outlined scenarios, there is a need for a technical solution that can ameliorate unnecessary network traffic and other problems associated with misidentified fraudulent transaction attempts as well as increase accuracy in properly identifying transactions which are fraudulent. Further, there is a need for a technical solution that can intercept a decision provided by a fraud engine and perform processing steps to ensure that the fraud engine decision is adequate (e.g., to avoid falsely identifying a transaction as fraudulent).

SUMMARY

The present disclosure provides a description of systems and methods for real time fraud decisioning in transaction processing and systems and methods for geographic location-based fraudulent activity verification.

A computer-implemented method for real-time fraudulent activity verification comprising: displaying, on a display of a user device, a first notification, the first notification prompting entry of a user-selected geographic area, wherein the user selected geographic area defines a valid region for processing of transactions associated with a user; receiving, by an input device of the user device, user-defined geographic data, wherein the user-defined geographic data specifies at least one user-selected geographic area and defines the valid region for processing of transactions; transmitting, by a transmitting device of the user device, the user-defined geographic data along with user data, wherein the user data identifies one of the user device or the user; receiving, by a receiving device of a user device, an second notification, the second notification being an authentication request message received in response to a proposed transaction associated with a user identifier related to the user; displaying, by a display of the user device, the second notification; receiving, by an input device of the user device, user-provided authentication data; and transmitting, by a transmitting device of the user device, the user-provided authentication data.

A system for real-time fraudulent activity verification comprising: a display device; a processing device configured to cause a display of a first notification on the first display device, the first notification prompting entry of a user-selected geographic area, wherein the user-selected geographic area defines a valid region for processing of transactions associated with a user; an input device configured to receive user-defined geographic data, wherein the user-defined geographic data specifies at least one user-selected geographic area and defines the valid region for processing of transactions; and a transmitting device configured to transmit the user-defined geographic data along with user data, wherein the user data identifies one of a user device or the user; and a receiving device configured to receive a second notification, the second notification being an authentication request message received in response to a proposed transaction associated with a user identifier related to the user; wherein the processing device is further configured to cause a display of the second notification on the display device, wherein the input device is further configured to receive user-provided authentication data, and wherein the transmitting device is further configured to transmit the user-provided authentication data.

A computer-implemented method for user-defined fraudulent activity determination, comprising: receiving, by a receiving device and from a user mobile device, user-defined geographic data specifying a valid region for processing of transactions along with user identification data; determining, based upon the user identification data, a user account number; storing, in a valid activity database, a valid activity data entry comprising the received user-defined geographic data along with the corresponding user account number; determining, based at least on the valid activity data entry, a fraudulent activity recommendation; receiving, by a receiving device and from a mobile application running on the user mobile device, at predetermined intervals, current geographic location data for the user mobile device; updating, by a processing device, the fraudulent activity recommendation based upon the received current geographic location data, wherein the updating is performed in response to the receipt of current geographic location data at predetermined intervals.

A system for user-defined fraudulent activity determination, comprising: a receiving device configured to: receive from a user mobile device, user-defined geographic data specifying a valid region for processing of transactions along with user identification data, and receive from a mobile application running on the user mobile device, at predetermined intervals, current geographic location data for the user mobile device; a processing device configured to: determine, based upon the user identification data, a user account number, store, in a valid activity database, a valid activity data entry comprising the received user-defined geographic data along with the corresponding user account number, determine, based at least on the valid activity data entry, a fraudulent activity recommendation, and update the fraudulent activity recommendation based upon the received current geographic location data, wherein the updating is performed in response to the receipt of current geographic location data at predetermined intervals.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 6A and FIG. 6B are illustrations depicting a user mobile application screen for defining geographic parameters by a user mobile application such as that of FIG. 4 in accordance with exemplary embodiments.

Figure 1:
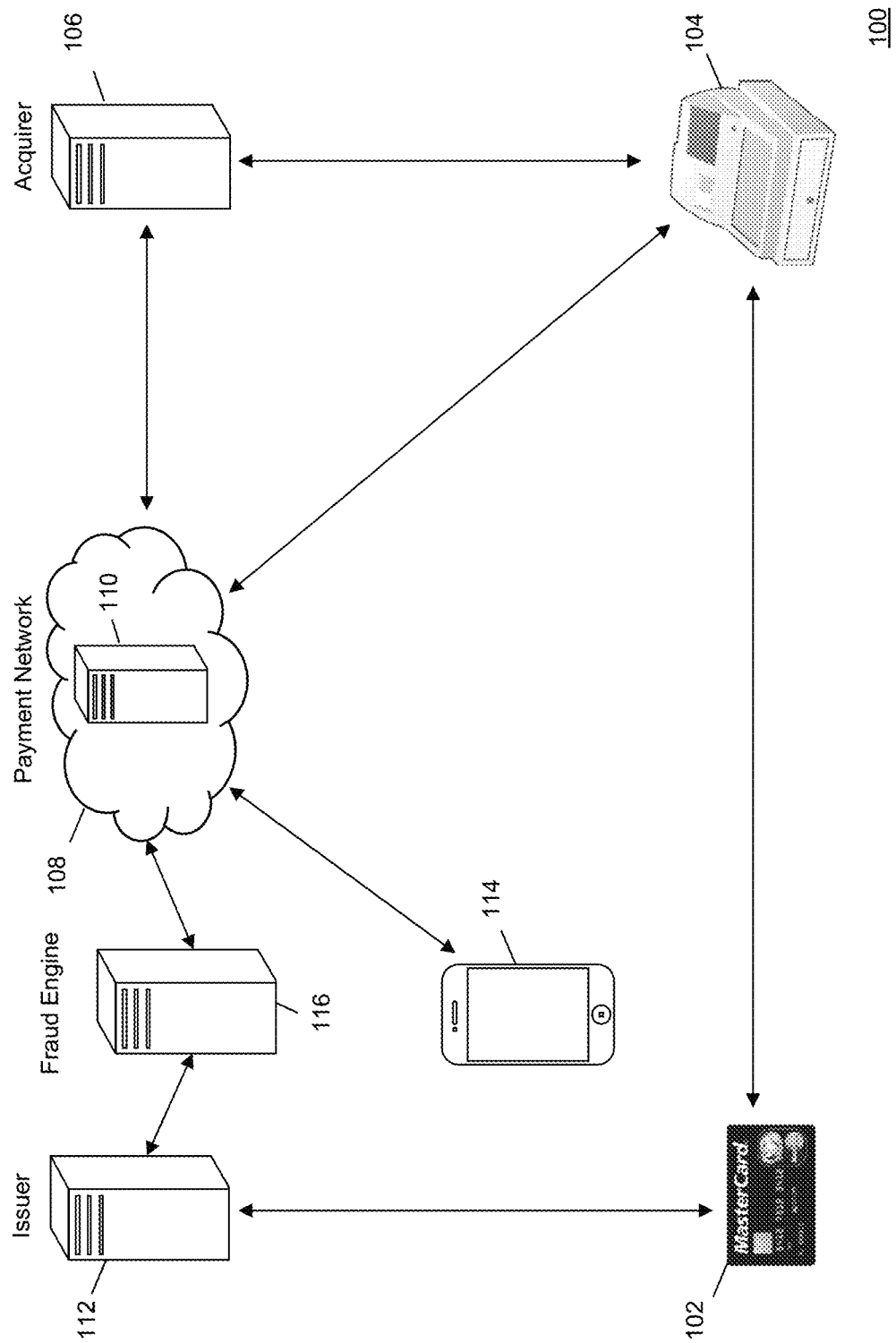
FIG. 1 is a high level architecture illustrating a system for real time fraud decisioning in transaction processing in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have and require special knowledge in offered products. In some embodiments, an entity involved in a single transaction may be considered a merchant. In some instances, as used herein, the term "merchant" may refer to an apparatus or device of a merchant entity.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Controlled Payment Number—Controlled payment numbers may be payment numbers associated with a payment account that are subject to one or more rules. In many cases, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children. Additional detail regarding controlled payment numbers may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. patent application Ser. No. 12/219,952, filed Jul. 30, 2008; U.S. patent application Ser. No. 12/268,063, filed Nov. 10, 2008; and U.S. patent application Ser. No. 12/359,971, filed Jan. 26, 2009; each of which are herein incorporated by reference in their entirety.

System for Real Time Fraud Decisioning in Transaction Processing and Updating Fraudulent Activity Parameters FIG. 1 illustrates a system 100 for real time fraud decisioning in transaction processing and for updating fraudulent activity parameters in accordance with exemplary embodiments.

The system 100 may include a consumer payment device 102 which may be a traditional payment card issued to a consumer and corresponding to a payment account. The consumer payment device 102 may comprise any payment card as the term is defined herein and may include, e.g., a user mobile device storing payment card data, a chip storing payment card data, a traditional credit card having a magnetic stripe, devices combining one or more thereof, etc. In some instances, the system may include a consumer payment card which is not associated with a device (e.g., a virtual payment number). The payment account associated with the consumer payment device may be held by or otherwise associated with acquirer 106 (e.g., a financial institution) and/or issuer 112 (e.g., an issuing bank). A consumer may use the consumer payment device 102 at a merchant point of sale device 104 to conduct payment transactions using the methods and systems discussed herein.

The system 100 may include a payment network 108. The payment network 108 may be configured to process payment transactions for transaction accounts using traditional methods and systems that will be apparent to persons having skill in the relevant art. The payment network 108 may include a processing server 110. The processing server 110 may be configured to communicate with a fraud engine (not pictured) which may be part of processing server 110 or separate from processing server 110 (e.g., as a standalone computer system or as part of the issuer 112 computer system).

The payment network 108 and in some instances the processing server 110 may communicate with an issuer device 112. The issuer device 112 may be a computer system of an issuer and may be configured to issue payment accounts (e.g., such as a payment account corresponding to consumer payment device 102) and, in some instances, payment card devices storing payment account data (e.g., a magnetic strip card, a chip card, etc.). In the system 100, the issuer device 112 may be configured to store payment account data related to a payment account corresponding to consumer payment device 102.

The issuer may issue a consumer payment card device 102 to a consumer, the consumer payment card device 102 being associated with a payment account to which the consumer has access. In some embodiments, the issuer may issue payment account data or data associated with the payment account (e.g., virtual payment numbers, limited use numbers, etc.) to the consumer which may be used similarly to consumer payment card device 102 to conduct payment transactions at a merchant point of sale device 104. The payment card device 102 (or payment account data/associated data) may be presented to a merchant point of sale device 104 for payment in a proposed payment transaction.

The merchant point of sale device 104 may, e.g., read payment details from a consumer payment card device 102 or otherwise receive payment details associated with the consumer payment account. The merchant point of sale device 104 may be associated with a merchant. The merchant point of sale device 104 may receive payment details (e.g., from a consumer payment card device 102) when the merchant point of sale device 104 is in close physical proximity to the payment card device 102 (e.g., an "in-person transaction" at a brick-and-mortar merchant store, etc.). Payment details may be received, e.g., by a magnetic stripe reader, a NFC device, manual entry via a keypad, scanning bar code data or another code, such as a code displayed on a screen of a user mobile device 114, etc. The reader device may be part of or connected to the merchant point of sale device 104 so as to provide input comprising payment account details to the merchant point of sale device 104. The merchant point of sale device 104 may receive payment details (e.g., from a consumer payment card device 102) when the merchant point of sale device 104 is not in close physical proximity to the payment card device 102 (e.g., an online transaction, etc.). The merchant point of sale device 104 may receive payment details from the consumer payment card device 102 (or may receive payment account data/associated data from a consumer) and may transmit the payment details to payment network 108, directly or indirectly (e.g., via acquirer device 106 of an acquiring bank) for processing. In some instances, the user mobile device 114 may perform some or all of the functions of the merchant point of sale device 114 (e.g., may transmit an authorization request, etc.)

In the system 100, the processing server 110 may receive a transaction request, e.g., an authorization request for a payment transaction, from merchant point of sale device 104 (e.g., via acquirer device 106). The transaction message for the electronic payment transaction involving the merchant point of sale device 104 and the consumer payment device 102 may include at least a first data element configured to store a payment account number associated with the consumer payment device 102 and one or more additional elements configured to store additional transaction data. In some embodiments, the transaction message may be electronically transmitted to payment network 108, which may forward the transaction message to processing server 110 via the payment rails. In some embodiments, the transaction message may be transmitted to the processing server 110 from the merchant point of sale device 104 (e.g., via the acquirer device 106 and/or another intermediate entity) and may be transmitted using the payment rails or a suitable alternative communication method. In instances where the payment network 108 may receive the transaction message first, the payment network 108 may be configured to forward the transaction message to the processing server 110 based on the primary account number stored in a transaction message data element. For example, the primary account number may include a bank identification number (BIN) within a range associated with processing server 110 which may be used by payment network 108 in the routing of received transaction messages.

The processing server 110 may provide input, the input comprising some or all of the transaction message data, to a fraud engine 116. In some embodiments, the fraud engine 116 may receive a transaction message, such as an authorization request, directly. The fraud engine 116 may be part of payment network 108 and/or processing server 110 or may be implemented within a device separate therefrom. In some embodiments, the fraud engine 116 may comprise, for instance, an API, a software package product, etc. and may be a service provided by a payment network 108, by an issuer computing system or device, etc. In some instances the fraud engine 116 may be incorporated into issuer device 112 or may be in communication with issuer device 112 or a computing system (e.g., a payment account management system) of an issuer device 112. In some instances the fraud engine 116 may incorporate the databases and other functions described as being part of and performed by the processing server 110 instead of or in addition to the processing server 110. Additional detail relating to fraud engines and fraud-engine-type devices may be found, for instance, in U.S. Pat. No. 7,428,509 and U.S. Pre-Grant Publication No. 2014/0122336 each of which is herein incorporated by reference in their entirety.

The fraud engine 116 may analyze the input received (directly or indirectly) from the merchant point of sale device 104. In embodiments, the fraud engine 116 may access account information corresponding to the payment account associated with the input data and determine if the transaction should be identified as fraudulent. The fraud engine 116 may comprise databases storing parameters for identifying fraud, both account specific and otherwise, as will be described herein and as may be apparent to those skilled in the relevant art upon reading the present disclosure.

If the fraud engine 116 determines that the transaction should be flagged as fraudulent, the processing server 110 may receive an output from the fraud engine 116 indicating that the authorization request received from merchant point of sale device 104 should be declined. For instance, the processing server 110 may receive a transaction message comprising a data field which includes a decline code. The processing server 110 may, inter alia, substitute or temporarily replace the decline code received from the fraud engine 116 (e.g., automatically upon receipt of the transaction message comprising the decline code) with a hold code. In embodiments, processing server 110 may transmit an authentication request message (e.g., as a data signal superimposed with authentication request data) to user mobile device 114 (e.g., via a user mobile application running on user mobile device 114). User mobile device 114 may be, for instance, a cellular telephone, a smart watch or other electronic wearable apparel, a tablet, an implanted smart device, a personal computing device, or any other device capable of two-way digital electronic communications which may be associated with a user by processing server 110 (e.g., by database querying or other processes performed by the processing server on the basis of a Mobile Identification Number (MIN), Static Internet Protocol (IP) Address, or any other address, temporary or permanent, that can be used with such a device (e.g., user mobile device 114). In some instances the user mobile device 114 may be replaced with another computing device suitable for performing the functions disclosed herein (e.g., a desktop computer, a smart television, etc.). Processing server 110 may additionally transmit, to a merchant point of sale device 104, an indication that processing of the proposed transaction is on hold (e.g., as an authorization response message or another transaction message).

User mobile device 114 or another computing device may, in response to the received authentication request, receive input from a user, e.g., the consumer associated with consumer payment device 102, and may transmit data to payment network 108 and processing server 110. The user mobile device 114 may be configured to access the payment network 108 and/or processing server 110 via an application stored entirely or partially on the mobile device, a web-based application, etc. The user mobile device 114 may be configured to communicate with the payment network 108 and processing server 110 via one or more networks using one or more communication protocols (e.g., such as those described herein in connection with FIG. 11). The user mobile device 114 may transmit an authentication response message based upon input received from a user in response to the authentication request message.

The processing server 110 may receive the authentication response message from user mobile device 114 and may determine whether the authentication response message is consistent with data related to the payment account associated with the consumer payment device 102. In the event that the authentication response message is consistent with data related to the payment account associated with consumer payment device 102, the processing server 110 may remove the hold code from the transaction and the processing of the transaction may proceed (e.g., the processing server 110 may transmit an authentication request to the issuer device 112, may transmit an authorization response to the merchant point of sale device 104, etc.).

In some instances, the processing server 110 may determine that the received authentication response message indicates that the payment transaction for which authentication is requested is not authentic (e.g., an unrecognized response has been received from user mobile device 114, a response has been received from user mobile device 114 which affirmatively indicates that the transaction is unauthentic, a response is not received from user mobile device 114 within a predetermined period of time, etc.). In such instances, the processing server 110 may deny processing of the transaction and may, e.g., transmit a message to the merchant point of sale device indicating further processing of the proposed transaction is denied. In some embodiments, the processing server 110 may automatically replace the hold with a decline code upon the expiration of such a predetermined period of time.

The user mobile device 114 may additionally enable a user of the mobile device 114 to register an account with processing server 110 or another entity of the payment network 108. As part of the registration process, a user may direct user mobile device 114 to electronically transmit registration information, including, e.g., payment account data and user mobile device 114 identification data.

For instance, the processing server 110 may receive registration information from the user mobile device 114 identifying the user mobile device and a payment account associated with the user. The user may, e.g., establish an account with the processing server by providing registration information and receiving a UserID and password for logging into an application for communicating with processing server 110. The user may, for example, provide various pieces of information to the processing server 110 via an application which may be stored on, partially stored on, or accessed via a web-browser of the user mobile device 114. The user may, for example, provide fraudulent activity information to the processing server 110 for identifying locations in which activity related to a payment account and/or a payment card device 102 of the user is likely fraudulent (or, e.g., information identifying locations in which such activity is likely authentic, etc.). The user mobile device 114 may further transmit contact information, which may include, for example, a communication method, network and/or protocol and a communication address. For instance, a user, via the user mobile device 114, may specify a push notification of the mobile application, a short messaging service (SMS), etc. as the communication method. Such communication specifications may be used by the processing server 110 to communicate with user mobile device 114. Other communication methods by which the processing server 110 may communicate with user mobile device 114 may include, for example, an application stored on or accessed by the user mobile device 114, e-mail, telephone, webpage, etc. with communication addresses which include, e.g., e-mail address, username, telephone number, internet protocol address, media access control address, serial number, registration number, identification number, etc. for display as an alert, generating an audio and/or tactile alert as well, for example. The processing server 110 may generate or update an existing account profile, for the payment account associated with the registration information received from user mobile device 114.

An entity of the payment network 108 or the processing server 110 may receive fraudulent activity information from the user mobile device 114 and may cause a fraudulent activity database and/or user account profile to be updated in accordance with the received fraudulent activity information. The fraudulent activity database may be, e.g., a database of the processing server 110, of a fraud engine 116 or of any other entity in communication with the payment network 108 or other entities therein. The entity of the payment network 108 or the processing server 110 may further receive current geographic location data from the user mobile device 114 and may check the received current geographic location data against stored fraudulent activity parameters of the fraudulent activity database. Instead of or in addition to the fraudulent activity database, a database storing valid activity parameters may be provided. The processing server 110 may access one or both of the databases to determine if proposed payment transactions occurring within a particular area should be identified (e.g., flagged) or not as fraudulent. In some instances, the processing server 110 may update a fraud engine 116 with fraudulent activity information (e.g., geographic data for identifying possible fraudulent activity based upon payment transaction origination information, such as the location of a merchant point of sale device, etc.). The fraudulent activity information of the updated fraudulent activity profile and/or user account profile may be implemented by the processing server 110 and/or the fraud engine 116, for real time fraud decisioning during transaction processing, as described above and further elaborated upon below.

The processing server 110 may provide transaction message data to the fraud engine 116 (e.g., which may be part of, or in communication with, issuer device 112 or issuer computer system). Some or all of the functions and configurations described in connection with processing servers discussed in connection with the figures of the present application may additionally, or instead, be comprised by or performed by fraud engine 116.

Fraud engine 116 may determine whether a proposed transaction should be flagged as potentially fraudulent. If fraud engine 116 determines that a proposed transaction should be flagged as potentially fraudulent, fraud engine 116 may communicate such to processing server (e.g. by transmitting a transaction message comprising a decline code, etc.).

Processing Server

Figure 2:
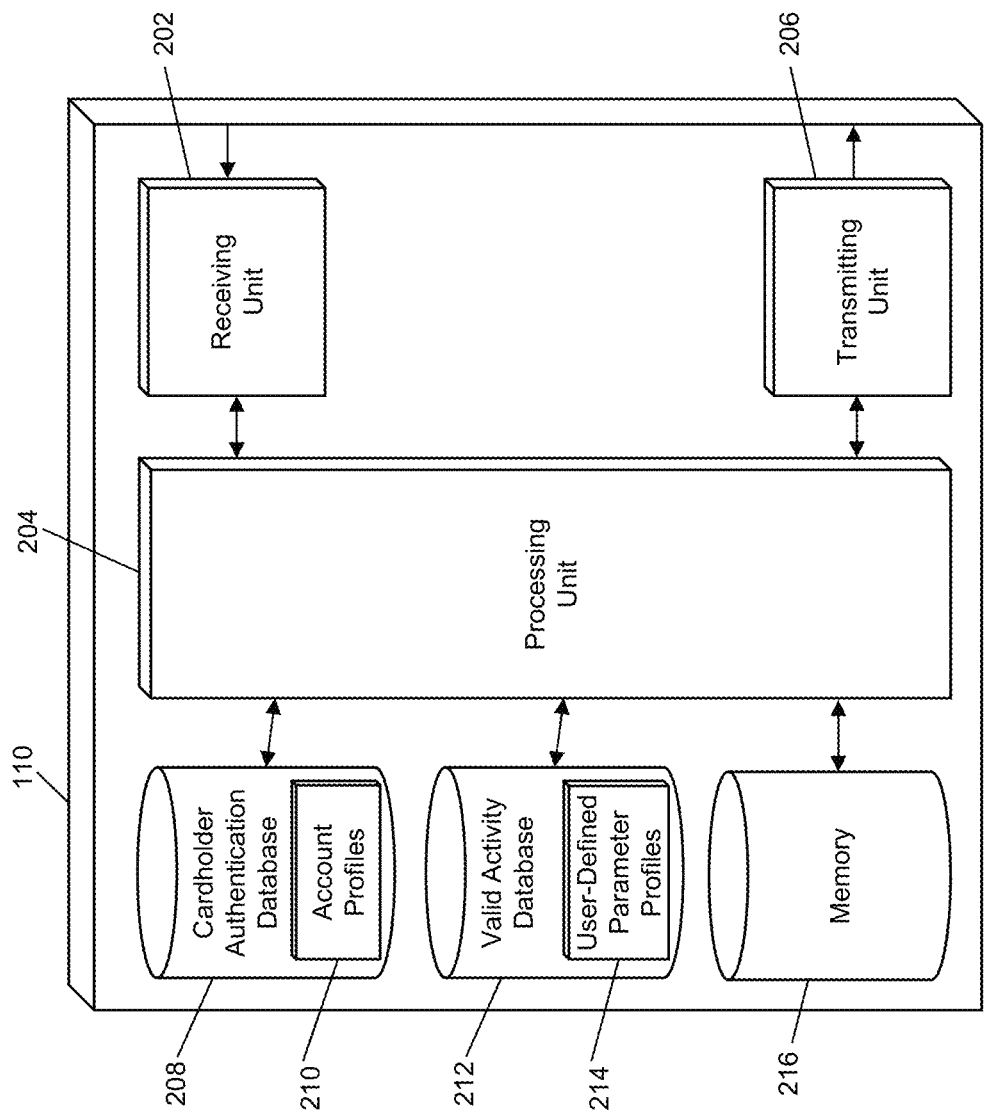
FIG. 2 is a block diagram illustrating the processing server of FIG. 1 for processing of payment transactions in accordance with exemplary embodiments.

FIG. 2 illustrates an embodiment of the processing server 110 of the system 100. It will be apparent to persons having skill in the relevant art that the embodiment of the processing server 110 illustrated in FIG. 2 is provided as illustration only and may not be exhaustive to all possible configurations of the processing server 110 suitable for performing the functions as discussed herein. For example, the computer system 1100 illustrated in FIG. 11 and discussed in more detail below may be a suitable configuration of the processing server 110.

The processing server 110 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks such as payment network 108 for the transmission of transaction messages that include sensitive financial data and information. In some instances, the receiving device 202 may also be configured to receive data from a user mobile device 114, merchant point of sale device 104, payment networks 108, and other entities via alternative networks (e.g., the Internet, cellular communication networks, etc.). In some embodiments, receiving device 202 may be comprised of multiple devices, such as receiving devices for receiving data over several networks. For instance, in embodiments, the receiving device 202 may comprise a first receiving device for receiving data over payment rails, a second receiving device for receiving data over the Internet, a third receiving device for receiving data via a cellular communications network, etc. The receiving device 202 may receive electronic data signals that are transmitted from devices external to the processing device, where data may be superimposed on the electronic data signals and such data may be decoded, parsed, read, or otherwise obtained via receipt of the data signal by the receiving device 202. In some instances, receiving device 202 may include a parsing module for parsing a received data signal to obtain data superimposed thereon. For example, the receiving device 202 may include a parser program configured to receive and transform the received data signal into usable input for the functions performed by processing device 204 to carry out the methods and systems described herein.

The receiving device 202 may be configured to receive data signals electronically transmitted by the user mobile device 114. The receiving device 202 may receive data signals electronically transmitted by the user mobile device 114 superimposed with information such as registration information, such as to register a user mobile device and payment account for fraudulent activity monitoring. The receiving device 202 may receive data signals electronically transmitted by the user mobile device 114 superimposed with information responsive to a message sent from the processing server 110 (e.g., a payment transaction authentication request message). Additional data signals may be received from the user mobile device 114, such as data signals superimposed with instructions and actions related to possible fraudulent activity identification (e.g., as part of a real time decisioning process; in response to a message received from a processing server 110 or other entity of the payment network 108; to identify possible fraudulent activity based on, e.g., location parameters, etc.). For instance, additional data signals may be related to the manual addition, revision and removal of fraudulent activity identification parameters, the registration of additional transaction accounts or the identification of one or more of multiple sets of user fraudulent activity parameters associated, e.g., with one or more of multiple users of a shared payment account.

The receiving device 202 may also be configured to receive transaction messages, such as may be received via the payment rails from payment network 108 or a merchant point of sale device 104 (e.g., directly or as transmitted via one or more intermediate entities). Transaction messages received from merchant point of sale device 104 may include authorization request messages. Transaction messages may be formatted pursuant to one or more standards, such as the International Organization of Standardization's ISO 8583 standard, and may include a plurality of data elements, where each data element may be configured to store payment and transaction data as set forth in the associated standards, such as a data element configured to store a primary account number, a data element configured to store a transaction amount, a data element configured to store a transaction time, etc. Transaction messages may also include a message type indicator, which may be indicative of a type of the transaction message, such as an authorization request, authorization response, etc. In some instances, a transaction message may also include a bitmap, which may indicate the data elements included in the transaction message and the data stored therein.

The processing server 110 may also include a communication module (not pictured) which may be configured to transmit data between modules, engines, databases, memories, and other components of processing server 110 for use in performing functions disclosed herein. The communications module may be comprised of one or more communication types and utilize various communication methods for communications within a computing device or system of computing devices. For example, the communication module may be comprised of a bus, contact pin connectors, wires, etc. In some embodiments, the communication module may also be configured to communicate between internal components of processing server 110 and external components of processing server 110, such as externally connected databases, display devices, input devices, etc. (e.g., an external fraud engine), as well as being configured to establish communication channels with outside systems and devices, such as merchant point of sale device 104. The processing server 110 may also include a processing device or processing unit 204 which may be configured to perform the functions of processing server 110 discussed herein as will be apparent to persons having skill in the relevant art. In some embodiments, the processing device may include and/or be comprised of a plurality of engines and/or modules specially configured to perform one or more functions of the processing device, such as a querying module, a valid activity processing module, a transaction processing module, etc. In some instances, the processing device may further comprise a fraud engine. As used herein, the term "module" may be software or hardware particularly programmed to receive input, perform one or more processes as described herein using said input, and provide an output resulting from the performance of the one or more processes. The input, output and processes performed by various modules will be apparent to one skilled in the art based on the present disclosure.

The processing server 110 may include memory 216. Memory 216 may be configured to store data for use by processing server 110 in performing the functions discussed herein. Memory 216 may be configured to store data using suitable data formatting methods and schema and may be any suitable type of memory, such as read-only memory, random access memory, etc. Memory 216 may include, for example, encryption keys and algorithms, communication protocols and standards, data formatting standards and protocols, program code for modules and application programs of the processing device and other data that may be suitable for use by processing server 110 in the performance of the functions disclosed herein. Memory 216 may also include or be comprised of a relational database that utilizes structured query language for the storage, identification, modifying, updating, accessing, etc. of structured data sets stored therein.

Processing server 110 may include a cardholder account database 208. Account database 208 may be configured to store a plurality of account profiles 210 using a suitable data storage format and schema. Account database 208 may be a relational database that utilizes structured query language for the storage, identification, modifying, updating, accessing, etc. of structured data sets stored therein. Each account profile 210 may be a structured data set configured to store data associated with a transaction account. Each account profile 210 may include at least a primary account number corresponding to a payment account, communication data for use in communicating with a consumer device (e.g., user mobile device 114) of a consumer associated with the payment account, and additional account information, such as transaction controls. Transaction controls may be set to control usage of the related transaction account in funding of an electronic payment transaction. Some or all of the transaction controls may also or alternatively be stored in a valid activity database 212 of processing server 110, such as within user-defined parameter profiles 214. The user-defined parameter profile 214 may comprise data identifying the account profile 210 associated with user device 114 (e.g., a payment account number, a consumer identifier, etc.).

Each user-defined parameter profile 214 may comprise controls for controlling usage of an associated payment account, such that proposed transactions to be funded by the associated payment account are flagged or otherwise identified as fraudulent if the controls are not satisfied. For instance, the user-defined parameter profiles may include data specifying a an area within which transactions are valid (e.g., by storing data points representative of the area within which transactions are valid along with data indicating the validity thereof). Valid activity database 212 may be a relational database that utilizes structured query language for the storage, identification, modifying, updating, accessing, etc. of structured data sets stored therein. A transaction message may be received, the transaction message requesting authorization of a transaction to be funded by the associated payment account and including a merchant identifier and/or merchant device information identifying the merchant and/or merchant point of sale device 104 from which the transaction message originated. The processing server 110 may identify, e.g. by querying a database of merchant point of sale data (not pictured), by parsing the transaction message received from the merchant point of sale, etc., the geographic location associated with merchant and/or merchant point of sale device 104 from which the transaction message originated.

The processing unit 204 may comprise a querying module (not pictured) which may be configured to execute queries on databases (e.g., the cardholder account database 208, the valid activity database 212, etc.) to identify information stored therein. The querying module may receive one or more data values or query strings, e.g., from a received transaction message which may have been parsed or may be parsed by the querying module, and may execute a query string based thereon on an indicated database, such as the cardholder account database 208, to identify information stored therein. The input received by the querying module may comprise, at least, a data field or data relating to a payment account of a consumer and may implement the payment account related data in a querying process performed on cardholder account database 208 to identify information stored therein. The querying module may output the identified information to an appropriate engine or module of the processing server 110 as necessary or to an external device. The querying module may, for example, execute a query on the account database 208 to identify a specific account profile 210 that is associated with the transaction message received by receiving device 202. The specific account profile 210 may be identified as an account profile 210 when the primary account number of the account profile 210 corresponds to the primary account number stored in a data element included in a received transaction message.

The processing unit may further comprise a valid activity processing module which may determine whether the geographic location associated with merchant and/or merchant point of sale device 104 is within a valid geographic area of the user-defined parameter profile associated with the payment account. If the valid activity processing module determines, e.g., by comparing data indicative of a merchant point of sale device 104 location and geographic location data of a user-defined parameter profile, that the merchant point of sale device 104 is within a geographic area identified as valid, the valid activity processing module may, e.g., transmit a signal indicating processing of a transaction should be allowed, provide a recommendation of the proposed transaction as "non-fraudulent" to a fraud engine (e.g., fraud engine 116), etc. If the valid activity processing module determines that the merchant point of sale device 104 falls outside of a geographic area identified as valid within a user-defined parameter profile, the valid activity processing module may, e.g., transmit a signal indicating processing of a transaction should be denied, provide a recommendation of the proposed transaction as "fraudulent" to a fraud engine, etc.

The valid activity processing module may be configured to receive, e.g., via receiving unit 202 and from user mobile device 114, via a user-defined parameter profile associated with user mobile device, etc., valid activity data. The valid activity data may comprise, e.g., user defined geographic location controls, which may identify a geographic area within which user activity should be flagged as valid (or, e.g., outside of which, user activity should be flagged as invalid) by processing server 110. Valid activity processing module may receive transaction message data, including, e.g., data indicative of a geographic location of origination of the transaction message and may be configured to output a recommendation as to the likely validity (or fraudulent nature) of a proposed transaction associated with the transaction message data.

In some instances, the valid activity processing module may receive the transaction message and parse the transaction message for geographic location data identifying a geographic origin of the transaction message. In some instances, another module, engine, or device of the processing server 110 may identify the geographic origin of the transaction message and provide the geographic origin information to the valid activity processing module as input data. In some instances, the valid activity processing module may determine the geographic origin of a transaction message. For instance, the processing server or an external device may comprise a merchant database, which collects data for merchant point of sale devices 104 and stores data related to merchant point of sale devices 104 based upon, e.g., a point of sale device identifier, a merchant identifier, etc. and geographic location data corresponding to a merchant location, point of sale device location, etc. The data indicating the location of the merchant or point of sale device may include, e.g., latitude and longitude coordinates and/or a street address.

The valid activity processing module may, e.g., receive or identify (e.g., by querying a merchant database) a geographic origin of a transaction message by identifying latitude and longitude coordinates associated with a merchant identifier related to the merchant point of sale device 104 from which the transaction message originated. The valid activity processing module may additionally receive input identifying a payment account (e.g., payment account data parsed from the transaction message by the valid activity processing module or another component of processing unit 104). Based upon the payment account information, the valid activity processing module may identify, e.g., within a user-defined parameter profile 214, an account profile 210, etc. a data entry corresponding to the payment account information. The valid activity processing module may, for instance, query a cardholder account database 208 to determine an account profile 210 corresponding to the payment account information. The account profile 210 may include data indicating that user-defined parameters have been set by a user corresponding to the payment account. The valid activity processing module may query the valid activity database 212 to determine a user-defined parameter profile 214 corresponding to the payment account or corresponding to data provided within the account profile 210. The valid activity database may identify geographic location data stored within a corresponding user-defined parameter profile 214 and may compare geographic location data stored within the user-defined parameter profile 214 with the geographic origin data for the transaction message.

For instance, the user-defined parameter profile 214 may include data entries specifying a range of latitude coordinates and a range of longitude coordinates. The parameter profile 214 may further include an indicator (e.g., in a data field related to the coordinates, specifying whether the range is associated with a valid transaction area). Alternatively, or in addition, the user-defined parameter profile 214 may store latitude coordinates and longitude coordinates outside of which transactions should be deemed likely fraudulent. The valid activity processing module may perform a comparison process (e.g., are the coordinates corresponding to the transaction message origin within the range associated with valid transaction activity of the user-defined parameter profile 214). Based upon the comparison, the valid activity module may output a recommendation (e.g., transaction is likely fraudulent, likely valid, recommend decline for fraud, etc.). In some instances, the valid activity module may output the recommendation to a fraud engine. In some instances, a fraud engine or other processing modules or engines may perform some or all of the functions attributed to the valid activity processing module.

The processing server 110 may also include a transaction processing module. The transaction processing module may be configured to perform functions of the processing server 110 suitable for use in the processing of payment transactions. For example, the transaction processing module may be configured to calculate fraud scores, perform data checks, or provide value-added services for payment transactions. Additional functions that may be performed by transaction processing module in conjunction with the initiation and processing of payment transactions will be apparent to those having skill in the art. In embodiments, transaction processing module may communicate with an external fraud engine (e.g., fraud engine 116). In embodiments, transaction processing module may comprise a fraud engine or may communicate with a fraud engine of processing server 110. The transaction processing module may receive input from, e.g., a fraud engine, the valid activity processing module, etc. For instance, a fraud engine may receive input from the valid activity processing module and compare such data with additional fraudulent activity scoring factors to determine a recommendation as to whether to decline or authorize a transaction and the recommendation may be provided to the transaction processing module. In some instances, such a determination may be made by the transaction processing module itself, by various fraud scoring processes which take into account any number of fraud identification factors.

In embodiments, the transaction processing module may receive an input from the fraud engine, the input identifying that the transaction message (e.g., the authorization request) should be declined. For instance, the transaction processing module may receive a message including a data field comprising a decline code. In some instances, the transaction processing module may transmit a message to a merchant point of sale 104 declining the transaction. In exemplary embodiments, the transaction processing module may identify the decline code (e.g., by parsing the message received from the fraud engine) and may replace the decline code (e.g., by modifying, overwriting, etc.) with a hold code. The transaction processing module may output a response to the transaction message received from the merchant point of sale device 104 (e.g., as an authorization response message) which includes a hold code. The transaction processing module may additionally transmit a signal indicating that a notification should be sent for authenticating the transaction.

In some instances, the transaction processing module may output the signal indicating that a notification should be sent for authenticating the transaction to an authentication module. The authentication module may determine, e.g., based upon specifications provided in an account profile 210 or user-defined parameter profile 214 corresponding to the payment account (by processes such as querying, etc., discussed herein) associated with the transaction message, that an authentication message should be sent to user mobile device 114 for authenticating the transaction. In some instances, the authentication module will determine that the authentication message cannot be sent to the user mobile device 114 (e.g., the message timed out, etc.) and will alternatively send a message to the merchant point of sale device 104 for authentication. In some instances, the authentication module will send authentication messages requesting user authentication to both user mobile device 114 and merchant point of sale device 104. In some instances, authentication messages may be transmitted to additional devices, to a communication address (e.g., an e-mail address) associated with a user, etc.

User authentication module may receive (e.g., by way of receiving unit 202), a response message from one of, or both, the user mobile device 114 and the merchant point of sale device 104. User authentication module may verify the received response against authentication data stored in a database (e.g. within an account profile 210 associated with the payment account). The authentication data stored in a database may be associated with transaction data of an authorization request for the proposed transaction (e.g., payment account information, a user identifier, etc.). For instance, the user authentication module may receive a message comprising a four-digit number and may compare the received four-digit number to a user Personal Identification Number (PIN) stored within an account profile 210 corresponding to the payment account. In some embodiments, if the authentication module determines the PIN and four-digit number to match, the authentication module may transmit a signal to the transaction processing module, indicating that the hold should be released from the transaction and the transaction should be processed. In some embodiments, if the authentication module determines the PIN and four-digit number do not match, the authentication module may transmit a signal to the transaction processing module indicating that the hold should be removed and the transaction should be declined. In some instances, the authentication module may receive a response indicating "yes" or "no" (e.g., a 1 or 0) from user mobile device 114 indicating whether a transaction should be authorized. In some instances, the authentication module may receive geographic location data from the user mobile device 114 which it may compare to data stored in databases discussed herein to determine whether a transaction should be authorized. The authentication module outputs a determination as to whether a transaction is authenticated or not, which may be received by the transaction processing module.

The transaction processing module may transmit a message to the merchant point of sale device 104 indicating the processing status of the proposed transaction and may, in some instances, transmit a notification to the user mobile device 114 indicating the same.

The processing server 110 may comprise a transmitting unit 206. The transmitting unit 206 may be configured to transmit data over one or more networks via one or more network protocols. In some embodiments, the transmitting device 206 may be configured to transmit data over the payment rails, such as using specially configured infrastructure associated with payment networks 108 for the transmission of transaction messages that include sensitive financial data and information, such as identified payment credentials. In some instances, the transmitting device 206 may be configured to transmit data to user mobile devices 114, merchant point of sale devices 104, payment networks 108, issuer systems 112, acquirer systems 106, etc., and other entities via alternative networks, such as the Internet. In some embodiments, the transmitting device 206 may be comprised of multiple devices, such as different transmitting devices for transmitting data over different networks, such as a first transmitting device for transmitting data over the payment rails and a second transmitting device for transmitting data over the Internet. The transmitting device 206 may electronically transmit data signals that have data superimposed that may be parsed by a receiving computing device. In some instances, the transmitting device 206 may include one or more modules for superimposing, encoding, or otherwise formatting data into data signals suitable for transmission.

The transmitting device 206 may be configured to electronically transmit data signals to the payment network 108 and/or merchant point of sale device 104 or another merchant computing system via the payment rails. Data signals transmitted to the payment network 108 and/or merchant point of sale device 104 or merchant computing system may include transaction messages, such as response transaction messages, which may be used in the processing of a related payment transaction. The transmitting device 206 may also be configured to electronically transmit data signals to the user mobile device 114 using a suitable communication method and protocol, such as data signals superimposed with automatically generated transaction controls and other data used in the management of a consumer's account registered with the processing server 110.

Process for Real-Time Fraud Decisioning

Figure 3A:
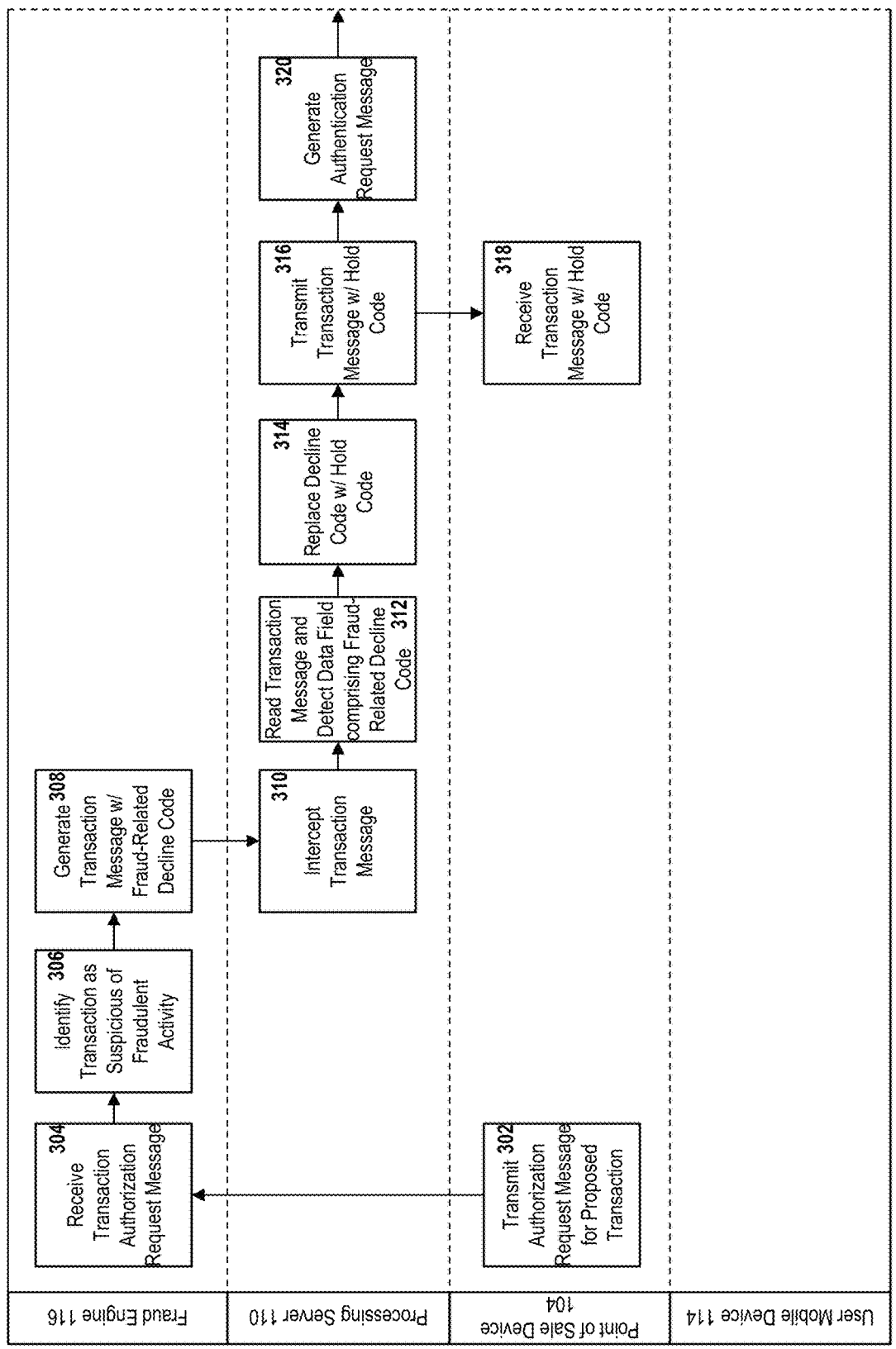
FIG. 3A is a first part of a flow diagram illustrating a process for real-time fraudulent activity decisioning in transaction processing via a processing server such as that of FIG. 2 and a fraud engine in communication therewith in accordance with exemplary embodiments.

FIG. 3A illustrates a first part of a process for real-time fraud decisioning in transaction processing.

In step 302, a point of sale device, such as merchant point of sale device 104 may receive payment information for a proposed transaction, including payment account information for a payment account to fund the proposed transaction (e.g., from consumer payment device 102). In embodiments, the point of sale device may generate an authorization request including the payment account information and additional transaction information. The point of sale device may transmit an authorization request message including the payment account information for the proposed transaction to a fraud engine (e.g., by way of a payment network, via a processing server, etc.). The transmitted authorization request message may include data identifying the merchant point of sale device from which the authorization request message originated (e.g., a merchant point of sale device identifier, a merchant identifier, etc.). The transmitted authorization request message may include data identifying a geographic location of the merchant point of sale device from which the authorization request message originated.

In step 304 a fraud engine 116 may receive the transaction authorization request message from the merchant point of sale device 104. In some instances, the fraud engine 116 may receive a portion of the transaction authorization request or data parsed from the transaction authorization request by another entity (e.g., the processing server, a device of the payment network, etc.). The authorization request may be a transaction message formatted based on one or more standards, such as the ISO 8583 standard, that includes at least a first data element configured to store a primary account number associated with the payment account proposed to fund the transaction. The authorization request may comprise one or more additional data elements configured to store transaction data and may comprise a message type indicator identifying the transaction message as an authorization request.

In step 306, the fraud engine 116 may identify the transaction as suspicious of fraudulent activity. For instance, the fraud engine 116 may be configured to receive real-time fraud detection data from transactions over a communications network. The fraud engine 116 may assess the transaction message received from the point of sale device based on a variety of factors which will be apparent to those skilled in the art upon reading the present disclosure. For instance, the fraud engine 116 may use smart agents, data mining processes, transaction rules (set by a cardholder, issuer, or otherwise), optimization, and various other fraud identification algorithms to analyze whether received transaction messages are likely fraudulent. The fraud engine 116 may store or have access to a database including a list of genuine and/or non-genuine merchants. The fraud engine 116 may have access or store transaction data related to particular card accounts including data related to normal or abnormal activity for the account (location, transaction attempts, average amount per transaction, average amount spent within a given time period, etc.), etc. Based on any number of factors listed above, or other factors which may be appreciated by one skilled in the art upon reading the present disclosure, the fraud engine 116 may identify the transaction as suspicious of fraudulent activity.

In step 308, the fraud engine 116 may generate a message, or update a transaction message, comprising a fraud-related decline code. The generated or updated message may be in the ISO 8583 standard or incorporate aspects thereof. The fraud engine 116 may attempt to transmit the transaction message comprising a decline code to the merchant point of sale device from which the authorization request originated in step 302. In some instances, the fraud engine 116 may transmit the message comprising the decline code to another entity, such as the processing server.

In step 310, the processing server may intercept the transaction message comprising the fraud-related decline code. In step 312, the processing server may parse the transaction message to detect the fraud related decline code in a data field of the transaction message. In step 314, the processing server may update the transaction message to include a hold code in the data field previously comprising the decline code. The modified transaction message may be transmitted to the merchant point of sale device with a hold code in step 316.

The merchant point of sale device may receive the transaction message comprising the hold code in step 318 and may await further instruction from the payment network and/or the processing server. In embodiments, the merchant point of sale may receive a message or notification other than the modified transaction message comprising the hold code which indicates to the merchant point of sale device that the transaction is on hold pending further action (e.g., authentication by a user, etc.). The transaction message including a hold code may cause a merchant point of sale device to display or otherwise signify to a merchant, cashier, etc. that input from cardholder is required for the transaction to continue (e.g., the additional instruction message may be transmitted in a custom data field of a message formatted according to the ISO 8583 standard). In some instances, a transaction message may not be sent to merchant point of sale device.

In step 320, processing server may generate an authentication request message or identify a pre-constructed authentication request message to transmit to verify whether the transaction should be declined for fraud or if it is a misidentified fraudulent transaction. The authentication request message may be formatted according to ISO 8583 or another standard. In some instances, the authentication request message may be transmitted in the form of a text or SMS message. In some instances, the authentication request message may be pushed to a user mobile device via a mobile application running and/or stored thereon.

Figure 3B:
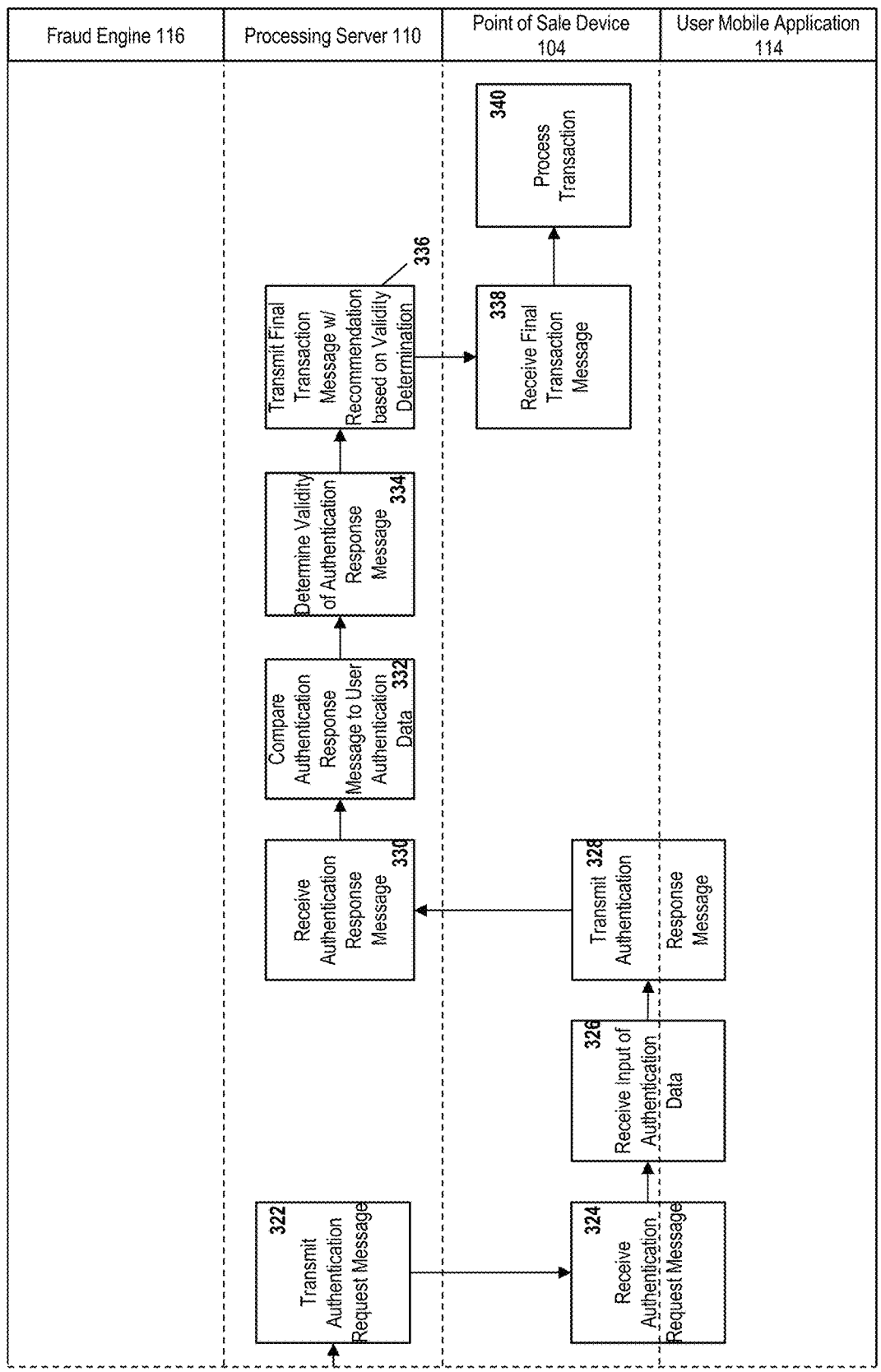
FIG. 3B is a second part of the flow diagram of FIG. 3A illustrating a process for real-time fraudulent activity decisioning in transaction processing where an authentication response message is received from one of the merchant point of sale device and a user device depicted in FIG. 1 in accordance with exemplary embodiments.

FIG. 3B illustrates a second part of a real time fraud decisioning process, such as that depicted in FIG. 3A.

In step 322, the authentication request message may be transmitted to, e.g., a user mobile application, another user contact address or user device, to the merchant point of sale device, or to one or more thereof. The authentication request message may be transmitted, by a number of communication methods as described herein and may, in some instances, be transmitted by more than one communication method (e.g., a request message may be transmitted via SMS and pushed to a mobile application running on a user mobile device, such as user mobile device 114). In embodiments, the request message may be transmitted in real-time (e.g., during transaction processing).

In step 324, the user mobile device or user mobile application may receive the authentication request message. Alternatively, or in addition, the point of sale device may receive the authentication request message or some other indication that user authentication data may be entered. The authentication request message may be pushed to the user mobile device from the processing server or another server in communication with the processing server (e.g., an application management server). The authentication request message may cause a notification to be displayed on user mobile device when user mobile application is running. In embodiments, user mobile application may be, e.g., a credit card management application, a banking application, etc. In embodiments, the authentication request message may cause a notification to be displayed on user mobile device even in instances where user mobile application is not presently running on user mobile device. The authentication request message may cause a display of the user mobile device and/or a screen of the merchant point of sale device or a device in communication with the merchant point of sale device to display a user interface requesting user input (e.g., a PIN, the last four digits of a social security number, a signature, a password, a drawing, a pattern, etc.). In some embodiments a user may be prompted by merchant point of sale device to enter authentication data in response to an authentication request message and the user may be unable or unwilling to enter authentication data at merchant point of sale device. In such instances, a merchant may cancel the transaction, the processing server may transmit a decline code after a certain time period has passed from the transmission of the authorization request message, etc. In some instances, an authorization request message is first transmitted to a user mobile device and, if a first predetermined period of time passes during which a response to the request is not received, processing server may transmit a second authorization request message (e.g. to merchant point of sale device). The second authorization request message may be associated with a second predetermined time period which may be the same or different than the first predetermined time period.

The receipt of an authentication request message may cause the user mobile device or application running thereon to display an authentication request message to a user on a display screen of the user mobile device. The user may view the request message, which may include text, illustrations, or other indicia indicating that user input is required for authentication of a transaction. In embodiments, the authentication request message may cause a visual alert (e.g., blinking) an audible alert or other sensory alert (e.g., vibration, sound, etc.), to be executed by the mobile device and/or the merchant point of sale device in connection with, e.g., a text display or illustration.

In response to the display, a user may input data. For instance, a user may check a box indicating "yes" the transaction is fraudulent. A user may enter a PIN number in response to a request therefor, a user may input or scan other identification information (e.g., a bar code or other machine readable code present at the merchant location), etc. In some instances, a user may provide, e.g., the last four digits of an identification number, such as a social security number. The user input may be received by the user mobile device or mobile application in step 326. User input may be received additionally or as an alternative by merchant point of sale device or a device in communication therewith. The user mobile device or mobile application or the merchant point of sale device may generate or modify a pre-existing response message which may be transmitted as a data signal to the processing server in step 328. The data signal may be superimposed with authentication information provided by the user input received by the user mobile device or mobile application or point of sale device. In some instances, the data signal may be superimposed with mobile device location information received from a mobile device location identifier of the user mobile device instead of, or in addition to, the received user input.

In some instances the authentication request message may be transmitted both to the user mobile device and point of sale device simultaneously, or may be transmitted subsequently. In some instances, a response may not be received from merchant point of sale device and a follow-up message may be transmitted to user mobile application, user mobile device, or another contact method or device associated with user (e.g., an e-mail address, a text message to a cellular telephone number, etc.). In such instances, method steps similar to those described in connection with FIG. 3C may be implemented (e.g., a hold may be placed on an account until a response is received from user, etc.).

The processing server may receive the authentication response message from the mobile application or mobile device in step 330. The authentication response message may comprise data input by the user at the user mobile device (or another device) and/or geographic location coordinates provided by the mobile device. The authentication response message may be formatted according to messaging standards discussed herein or in another messaging format. The processing server may be configured to parse the authentication response message to determine the user input included within the authentication response message. The processing server may compare the received user input to user authentication data. User authentication data may be data such as that stored in connection with a user account profile 210 of cardholder account database 208 as discussed in connection with FIG. 2. In embodiments, the processing server may query a database storing user authentication data associated with a user related to the payment account proposed to fund the pending transaction for data matching the user input data received from the user mobile application or user mobile device. In embodiments, the processing server may not necessarily be required to query a database to determine authentication (e.g., in some instances, the authentication response message may include a value indicative of a user response, e.g., a "1" or a "0"). In embodiments, the processing server may query a database for location parameters similar to location parameters received from user mobile application/user mobile device.

In step 334, the processing server may determine validity of the authentication response message, e.g., as a result of step 332. For instance, if user PIN data is received and the received user PIN data corresponds to PIN data stored in a database associated with the user, the processing server may determine the transaction is authenticated. For instance, if the user PIN data and stored PIN data were to not be similar, the processing server may determine the transaction is likely fraudulent.

In step 336, the processing server may transmit a transaction message (e.g., an updated or subsequent transaction message) to point of sale device, wherein the final transaction message comprises a recommendation based on the validity determination of step 334. For instance, the processing server may transmit a transaction message to point of sale device indicating that the transaction should be declined. The processing server may transmit a transaction message indicating the transaction should be authorized, etc. In some instances, the processing server may authorize and process the transaction and transmit a message indicating that the transaction has been processed (e.g., in such instances, the merchant point of sale device will not need to transmit additional authorization requests to the payment network for the transaction).

In step 338, the merchant point of sale device may receive a final transaction message (e.g., with a recommendation based on a validity determination). In some instances, the final transaction message may indicate that the transaction has been approved. The final transaction message may be, e.g., formatted according to ISO 8583 standards. In some instances, the final transaction message may indicate that additional action is necessary at the merchant point of sale device (e.g., the payment device details may be read by merchant point of sale device a second time, an authorization request may be resubmitted, etc.). In some instances (e.g., when authentication is unsuccessful), the final transaction message may indicate that processing of the transaction has been denied. In step 340, the merchant point of sale may proceed with processing or denial of processing of the proposed transaction.

Figure 3C:
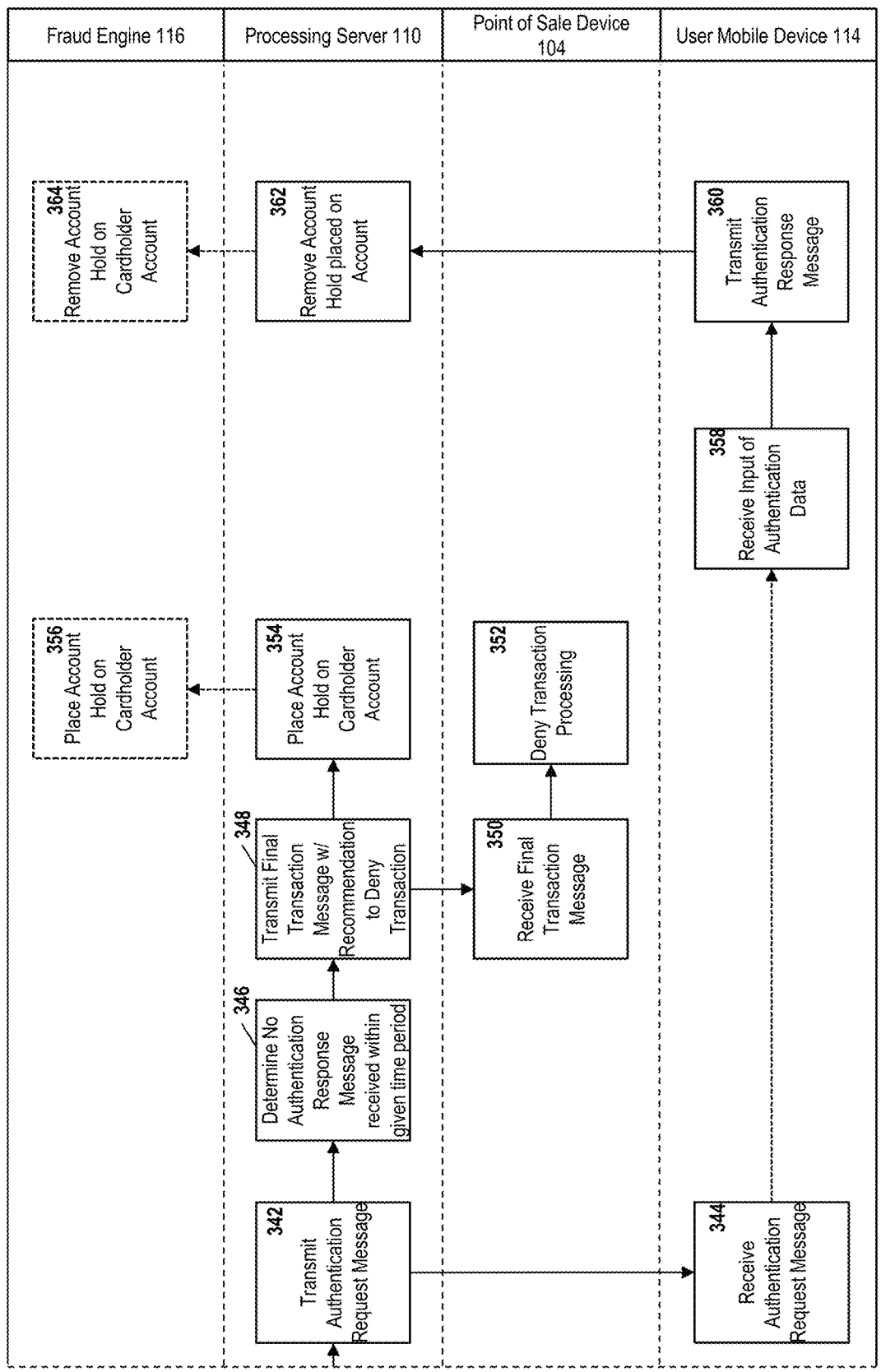
FIG. 3C is an alternative second part of the flow diagram of FIG. 3A illustrating a process for real-time fraudulent activity decisioning in transaction processing where an authentication response message is not received within a defined time period in accordance with exemplary embodiments.

FIG. 3C is a second part of the flow diagram of FIG. 3A illustrating a process for real-time fraudulent activity decisioning in transaction processing where an authentication response message is not received within a predetermined amount of time (e.g., during processing of the transaction).

In step 342, the authentication request message may be transmitted to a user mobile application/user mobile device or additional contact device or address associated with user (e.g., an e-mail address, etc.). The user authentication request message may be received by the user mobile device in step 344 during transaction processing. In some instances, the authentication request message may be received by the user mobile device subsequent to a denied transaction, as discussed above, in connection with FIG. 3B.

In step 346, the processing server may include a timer, clock, or be otherwise configured to determine whether an authentication response message is received within a time period following the transmission of an authentication request message. If a predetermined time period lapses and no authentication response message has been received, the processing server may transmit a final transaction message with a recommendation to deny transaction processing. In embodiments, the final transaction message may be an updated transaction message in which the "hold" code is replaced by the processing server with a "decline" code.

In step 348, the processing server may transmit the final transaction message with recommendation to deny the transaction to point of sale device. The point of sale device may receive the final transaction message in step 350 and may deny transaction processing (e.g., decline the transaction) in step 352.

When a final transaction message is transmitted with a recommendation to decline the transaction, optionally, a hold may be placed on the cardholder account. In step 354, the processing server may place a hold on cardholder account, by, e.g., updating a database entry, such as account profile 210 of account database 208 to indicate that the payment account is on hold (e.g., is temporarily unavailable for use). In some instances, an indication to place a hold on a cardholder account may be transmitted to the fraud engine 116 in step 356 which may perform functions described in step 354 instead of, or in addition to, the processing server. In some embodiments, the fraud engine 116 may be part of, or in communication with, the issuer device or issuer computing system 112.

In some embodiments, a predetermined time period may be set, e.g., by processing server, by fraud engine 116, etc., during which an authentication response must be received. If an authentication response is not received within the predetermined time period (e.g., a time period subsequent to a declined transaction but preceding the placement of a hold on an account), the processing server, fraud engine 116, issuer computer system, or one or all of these, may place a hold on a cardholder account associated with the declined transaction.

In step 358, a response may be entered by a user, to the authentication request message transmitted in step 342. The response may be entered at a user mobile device, via an application running thereon, or via another device (e.g., via an e-mail transmission from an e-mail account associated with user in a database accessible by processing server and/or fraud engine 116). The response may be transmitted in step 360 by user mobile device or another device to the processing server.

After a time period has lapsed and a card account data entry has been updated to include a hold by processing server, fraud engine 116, an issuer computer system, or some or all of these, a response to the authentication request message may be received by processing server. In step 362, upon performing authentication checks similar to those described in steps 330-334 of FIG. 3B, the processing server may remove the hold associated with the cardholder account (e.g., the processing server may remove an account identifier from a list of accounts "on hold," may update a data entry storing an account profile to remove a "hold" indication, etc.). In some instances, the fraud engine 116 may remove a hold placed on an account, instead of, or in addition to processing server, in step 364.

Process for User-Defined Transaction Validity Parameters

Figure 4:
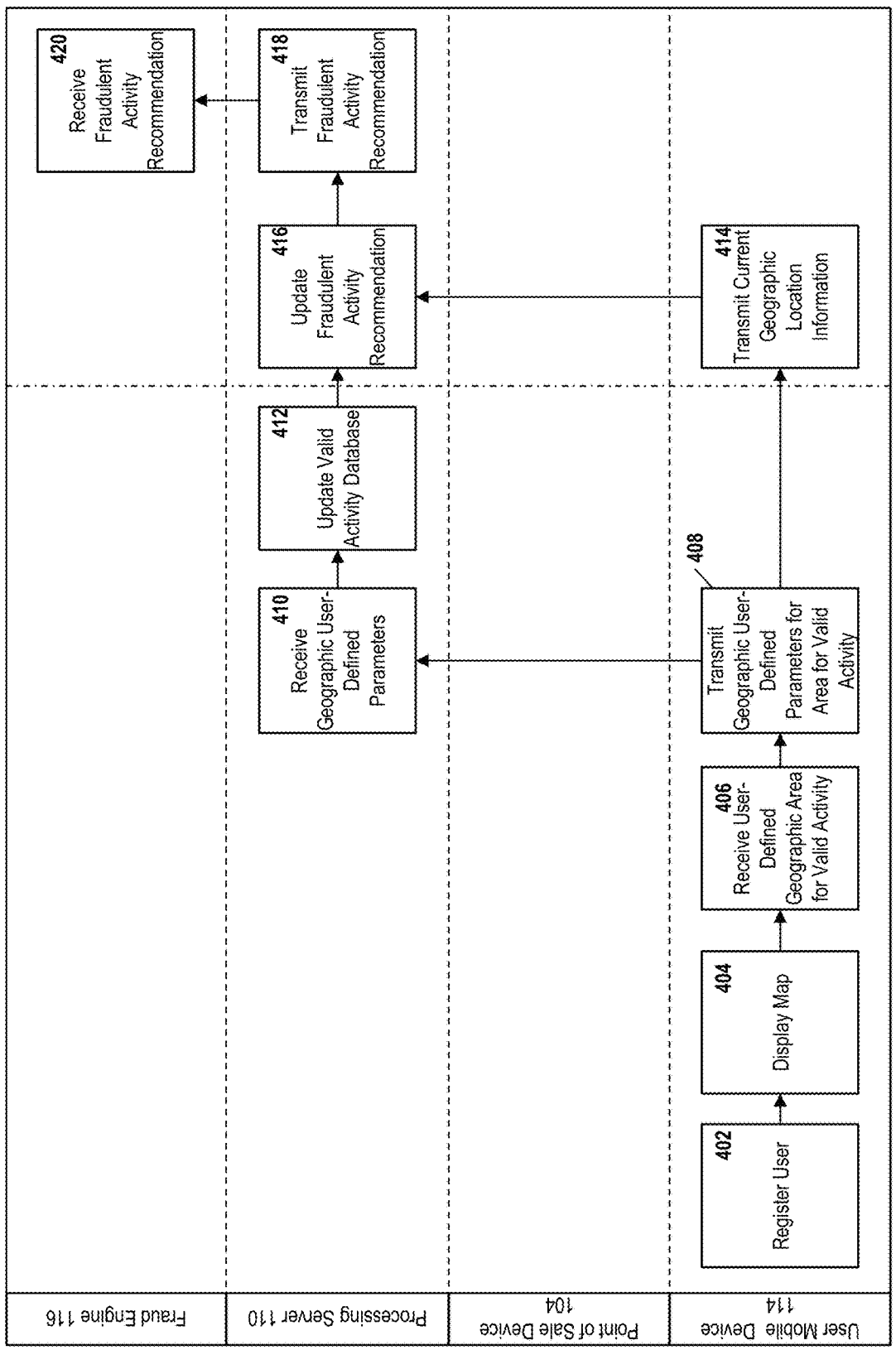
FIG. 4 is a flow diagram illustrating a process for updating a fraudulent activity parameter performed by a processing server such as that depicted in FIG. 2, wherein the updating is based upon geographic location information defined by a registered user and current geographic location information provided by a user mobile application in accordance with exemplary embodiments.

FIG. 4 is an illustration for user-defined transaction validity parameters which may be implemented, e.g., in a real-time fraud decisioning processes or in connection with such processes, such as those described herein.

In step 402, a user may register with processing server and/or a transaction control system which may be implemented by processing server or another entity. The user may register with a user mobile device such as user mobile device 114, e.g., via a mobile application running thereon. The user may instead register via another computer device (e.g., a laptop computer, desktop computer, tablet, notebook computer, additional cell phone, smart phone, smart television, other smart or wearable technology, etc.), for instance via a webpage or web application.

As part of the registration process, a user may electronically transmit payment account data associated with a payment account of the user to processing server. Registration information may include account profile information, such as contact information for contacting the user, including device addresses and contact numbers, e-mails, etc. User registration information may be transmitted, e.g., to the processing server, or an application server or other server which manages a user account. User registration is described in more detail in connection with FIG. 1 herein and additional user registration processes for registering a user with a transaction control system may be implemented such as will be apparent to those having skill in the art.

The processing server, such as processing server 110, may generate an account profile corresponding to user registration information or may identify a preexisting user account data entry and update the user account data entry to include user registration information or link the preexisting user account data entry to user registration data.

A registered user may login to the user application or a webpage or web application and may, via the application, update transaction controls associated with a user account. For instance, updateable transaction controls may be custom controls associated with payment cards or controlled payment numbers of the type implemented by MasterCard's® inControl™ platform.

User mobile application (or a web application, web page, or other computer application, etc.) may be configured to display a map to a user in step 404. In embodiments, user mobile application may be configured to communicate with a mapping program of another mobile application (e.g., a navigation application, etc.) and retrieve map data therefrom (e.g., a proposed route, proposed time of arrival, estimated time in traffic, etc.).

In step 406, the user mobile application may be configured to receive a user-defined geographic area. For instance, the user mobile application may be configured to receive a user-defined area (e.g., drawn with a stylus, a user finger, a mouse, etc. on the displayed map) provided by user. The user mobile application may additionally receive user input indicating whether the identified transaction area is "valid" or not. The user mobile application may further receive user input indicating time periods during which transactions within the user-defined area may be valid, etc.

The user mobile application may, for instance, receive or convert the received user input to, e.g., geographic coordinates of latitude and longitude, street address data, defining valid street addresses within the user-defined area, etc. In some instances, the user mobile device may set up a geofence based upon the received coordinates. In some instances, the user mobile application may be configured to detect instances when the user device enters or exits the geofence and perform an action (e.g., transmit current location data) in accordance therewith. In step 408, the user mobile application may transmit the geographic user-defined parameters for an area of valid account activity to a processing server or another transaction control server.

In step 410, processing server may receive geographic user-defined parameters and may store the user-defined parameters within a data entry, such as a user-defined parameter profile, of a database, such as valid activity database 212. In some instances, the user-defined parameters may be stored in association with a valid time period. In some instances, the database may be configured to delete user-defined parameters after a valid time period associated with the user-defined parameter has passed. The data entry in which the user-defined parameters are stored includes user account information, such as a user identifier, a payment account identifier, etc. In some instances, the processing server may update a previously existing valid activity database entry. In some instances, the processing server may create a new valid activity database entry, based upon the received parameters and database specifications (e.g., pre-programmed database entry formats) of the valid activity database.

In step 414, the user mobile application may be configured to transmit current geographic location information from time to time to processing server. The current geographic location may be transmitted, e.g., at periodic intervals, upon the occurrence of certain events, etc. In embodiments, the current geographic location information may be transmitted to processing server in response to an authentication request message, such as those discussed in connection with FIGS. 3A-3C. In embodiments, the mobile application may have access to user-defined parameters stored at processing server or may locally store user-defined transaction controls similar to those stored at processing server. In such embodiments, mobile application may periodically monitor the geographic location of the mobile device to determine if the mobile device is within the user-defined valid transaction area and may transmit current geographic location information periodically or upon the detection of a deviation from the user-defined valid transaction area, or both.

In step 416, the processing server may update a fraudulent activity recommendation based upon the user-defined parameters (e.g., stored in a database of the processing server or accessible thereby) and the received current geographic location information (or a pattern of recently received geographic location information). The processing server may analyze the received current geographic location data (or recently received geographic location data or both) along with the user-defined transaction parameters stored in the database to determine a fraudulent activity recommendation. For instance, the processing server may query the valid activity database to determine whether a user profile associated with the user logged into the mobile application from which current geographic location information is received includes geographic coordinates corresponding to the current geographic location information. Based upon an analysis of the information received in steps 410 and 414, the processing server may update a fraudulent activity recommendation.

The processing server may transmit the fraudulent activity recommendation in step 418 to fraud engine 116. In step 420, fraud engine 116 may receive the fraudulent activity recommendation and may apply it to transactions proposed to be funded by a payment account associated with the registered user. The fraudulent activity recommendation may be for an indefinite period of time or may expire after a period of time determined by the processing server (e.g., based upon the user-defined parameters). Steps 416-420 may be performed from time-to-time (e.g., every 5 minutes, every half hour, etc.) or upon the occurrence of certain events (e.g., upon the receipt of parameter data or current location data from user mobile application). In embodiments, the fraud engine 116 may perform some or all of the steps performed by the processing server, or may receive information from the processing server and may determine a fraudulent activity recommendation based upon the received information (e.g., processing server may transmit data received in 410 and 414 to fraud engine 116 without an activity recommendation, etc.).

Steps 404-412 comprise user-defined parameter setting (e.g., by user interaction with a mapping interface) and the transmission of such parameters to a server which may update a database accordingly, as described above. These steps may be performed multiple times and may add to or replace data stored in the valid activity database. In embodiments, steps 404-412 may be considered as part of a "set up" process and initiated by a user. In embodiments, steps 404-408 may be performed by interfacing with another user application (e.g., a navigation application, etc.) to pull user travel route data therefrom. In some embodiments not depicted in FIG. 4, some or all of steps 410-416 may be performed by the fraud engine 116 in addition to, or instead of, by the processing server 110.

Steps 414-420 may be performed from time-to-time or upon the occurrence of certain events, described herein or such as will be apparent to those having skill in the relevant art. Steps 414-420 are ongoing and may occur with or without user interaction. In embodiments, a mobile device, such as user mobile device 114 may perform step 414 via or separately from user mobile application.

In some embodiments, the user device may transmit transaction parameters (e.g., controls, geographic coordinates, etc.) directly or indirectly to fraud engine 116 without communicating with processing server 110. In some embodiments, the fraud engine 116 may access databases of the processing server, may store databases similar to those described in connection with processing server 110. In embodiments, the fraud engine 116 may be configured to perform functions attributed to the processing server 110 or processing servers of FIGS. 3A-3C and 4. In embodiments, the fraud engine 116 may be configured to interface with the issuer computer system and manage databases (e.g. payment account databases) of the issuer computer system.

The processes of FIGS. 3A-3C may be implemented in connection with the process described in connection with FIG. 4. In some embodiments, a user may specify one or more areas (with or without additional controls such as time, date, spending limit, etc.), within which an authentication request message should be transmitted (e.g., within which the fraud engine 116 may identify a transaction as potentially fraudulent, and recommend declining the transaction, such as described in connection with FIGS. 3A-3C. In embodiments, the mobile application describe in connection with FIGS. 3A-3C and FIG. 4 may be a same mobile application. In some embodiments, a user may define the format and information requested by authentication request message (e.g., by providing input to mobile application, etc.). User controls, including those related to an authentication request format and others described herein may be stored within an account profile of a user (e.g., such as an account profile 210 of cardholder account database 208) and/or within a similar database external to processing server (e.g., at issuer device 112, within fraud engine 116, etc.).

Exemplary User Interface Associated with the Real-Time Decisioning Process of FIGS. 3A-3C.

Figure 5B:
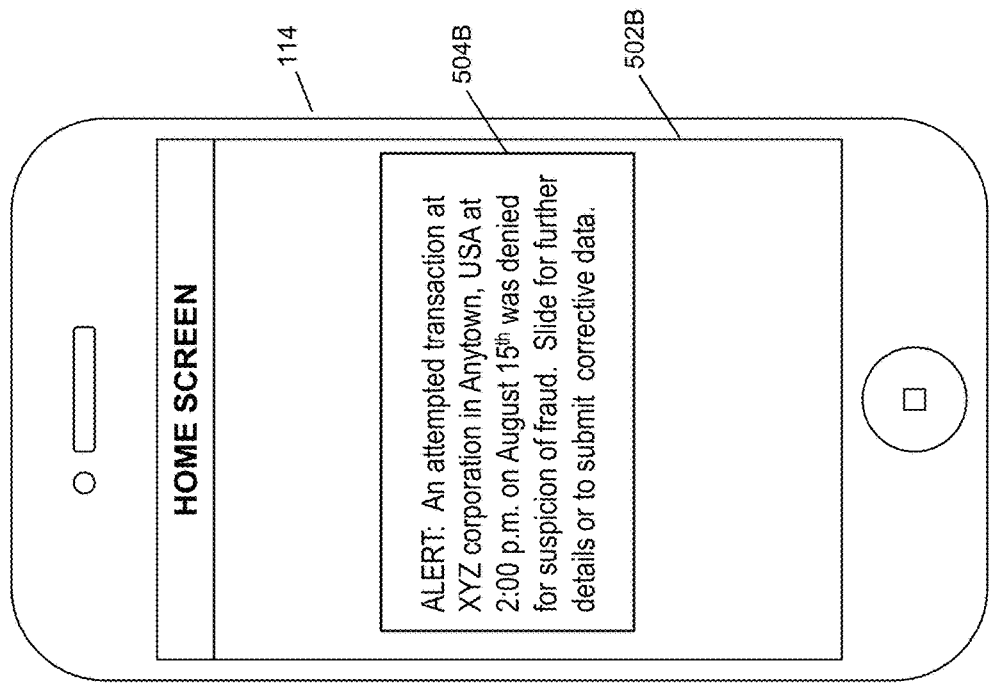
FIG. 5A and FIG. 5B are illustrations depicting messages received by a user mobile application such as that of the flow diagrams of FIGS. 3A-3C in accordance with exemplary embodiments.
Figure 5A:
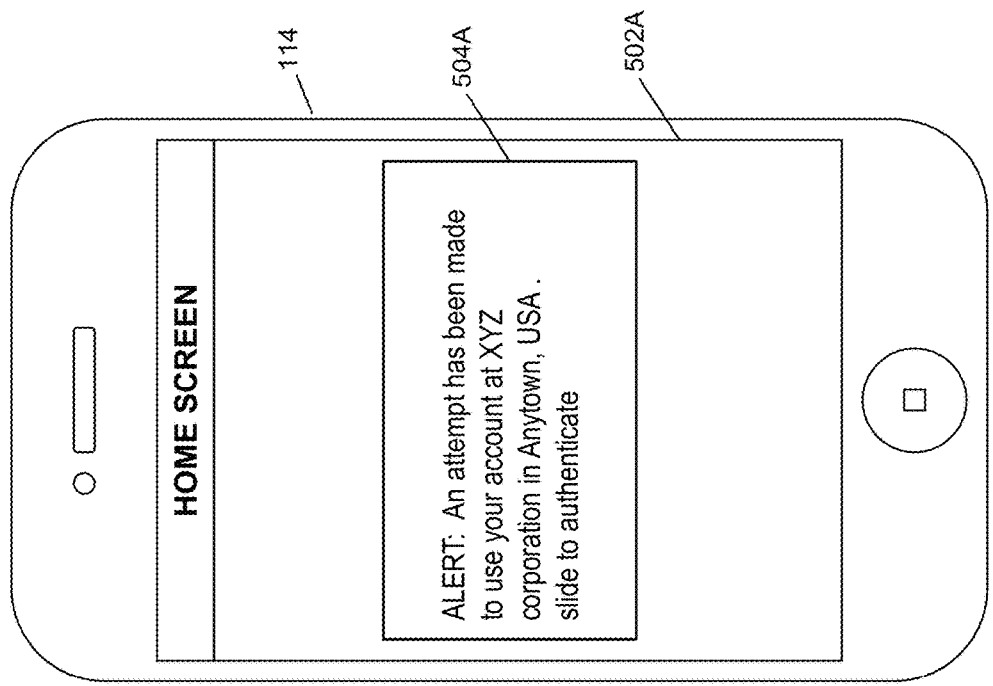

FIGS. 5A and 5B depict exemplary user notifications which may displayed on a mobile device in connection with the Processes described by the flow charts of FIGS. 3A-3C.

When an authentication request is transmitted (e.g., by the processing server of FIGS. 3A-3C) to a user mobile device or application running thereon, the mobile device 114 may be configured to display an alert message to a user. In FIG. 5A, mobile device 114 may display, e.g., on touch display 502A an alert message 504A. The alert message may be displayed when the mobile device 114 is in an unlocked or locked state and may cause additional sensory alerts to be executed by mobile device 114 (e.g., a noise may accompany alert, etc.).

As depicted in FIG. 5A, a user may be prompted to interact with a mobile application or to otherwise provide authentication data to the processing server to enable processing of a transaction. The user may, e.g., interact with the alert message and proceed to a user interface which requests further information from user (e.g., a PIN, a password, personal identifying information, a confirmation message, such as a "yes" or "no," etc.).

In certain instances, e.g., instances where a transaction is not a valid transaction, instances where a user mobile device is not on the person of a user attempting to conduct a payment transaction, etc., a second notification may be transmitted by processing server 110 and received by mobile device 114. The notification may be displayed on screen 502B and may comprise an alert message indicating that an attempt to use a payment account of the user has occurred.

The user may interact with the alert message and proceed to an additional screen displayed on the user mobile device 114. The user may, for instance, be prompted to enter a PIN or other identifying information, as discussed herein, which may be transmitted to processing server 110. In some instances, the user may be notified that a temporary hold is placed on the account via mobile device 114 (e.g., via a mobile application configured to transmit alerts 504A and 504B). The user may via the mobile device 114 or an application running therein, transmit data to processing server to update the status of the account (e.g., to request the temporary account hold be extended, to cancel the account hold, to make the account hold permanent, cancel the account, etc.).

Exemplary User Interface Associated with the User-Defined Parameter Identification Process of FIG. 4

FIG. 6A and FIG. 6B depict exemplary user interfaces for an application which may be implemented to perform some of the steps of the process of FIG. 4.

In FIG. 6A, a mobile application may, e.g., after a user has logged into the application, in response to a user selection on a menu of the application, etc., display on display 602A of user mobile device 114, a map 604A. The map may be, for instance, of an area near a current geographic location of the user mobile device. The map display may be a map of a geographic area previously identified by a user and stored by the app, may be based on user input identifying a location (e.g., by street address, geographic coordinates, point-of-interest name, etc.).

Display 602A may further display a prompt such as text 606A which directs a user to "identify valid transaction area." Further instructions or prompt information may be displayed to a user as will be apparent to those skilled in the relevant art upon reading the present disclosure. The display 602A is configured to receive user input. The display 602A may be a touch screen display. User input may be input, for instance, by a user tracing an area around which user transactions associated with a user payment account should be considered valid (e.g., flagged as valid by the processing server, fraud engine, etc.). For instance, a user may touch display 602A with a finger or stylus and draw an irregular shape around a location in which the user is located or intends to be located. Subsequently or previously displayed user interface displays may prompt additional parameter data related to the identified valid transaction area. For instance, the user may be prompted to enter a time period during which transactions within the identified area should be deemed as valid. In some instances, the user may provide additional transaction control information for the valid transaction area (e.g., controls on particular types of merchants, amount to be spent, etc. within the identified area).

In FIG. 6B display 602B of user mobile device 114 may display map 604B along with an indication that a user should enter route data, such as the text displayed in notification 606B. A user may, e.g., using a stylus, a finger, etc., provide a route the user is currently traveling, expects to travel in the future, etc. A user may, e.g., on an additional interface display of the mobile application, define a distance from the route. For instance, a user may select or input data which specifies that transactions within a 2 mile radius of traced route 608B should be identified as valid. In embodiments, if a user fails to specify such a radius, one may be automatically set by the mobile application and/or processing server. In embodiments, additional transaction controls may be set (e.g., a time, a date, a type of merchant, etc.) in connection with the traced route 608B (or identified area 608A).

Exemplary Method for Real-Time Fraudulent Activity Verification

Figure 7:
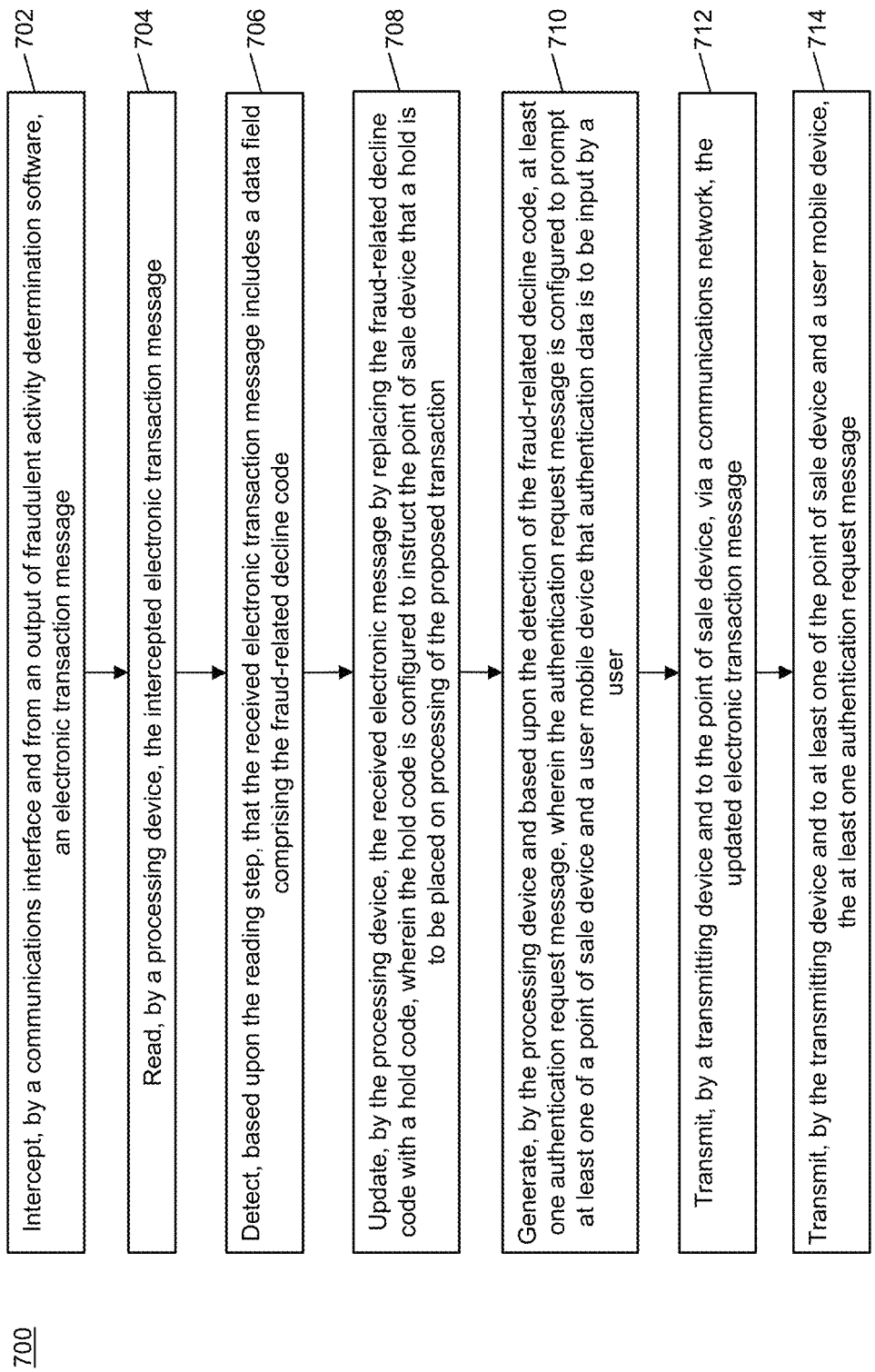
FIG. 7 is a flow diagram illustrating a process for real time fraudulent activity decisioning performed by a processing server such as that depicted in FIG. 2 in accordance with exemplary embodiments.

FIG. 7 illustrates method 700 for real-time fraudulent activity verification.

In step 702, a device, such as a processing server (e.g., processing server 110) may intercept, by a communications interface and from an output of fraudulent activity determination software or a fraudulent activity determination device, etc. (e.g., a fraud engine), an electronic transaction message. The electronic transaction message may be an authorization response message. The electronic transaction message may have been generated in response to an authorization request message, wherein the authorization request message (a) was associated with a user account identifier; (b) was received by a server, via a server communications interface from a point of sale device; and (c) comprised transaction data associated with a proposed transaction to be processed at the point of sale device in association with the user account identifier. The authorization response message may be formatted in accordance with an electronic financial transaction message protocol (e.g., ISO 8583). The authorization response message may comprise a fraud-related decline code indicating, e.g., that the proposed transaction that is the subject of the authorization request should be declined by the point of sale device from which the authorization request originated. In step 704, a processing device may read the intercepted electronic transaction message (e.g., by parsing the intercepted message). The transaction message intercepted by processing server, may be formatted according to one or more standards (e.g. ISO 8583) and may include a plurality of data elements including at least a data element configured to store a decline code, which may indicate the decline code is due to potential fraud.

In step 706, the processing device may detect, based upon the reading step 704, that the received electronic transaction message includes a data field comprising a fraud-related decline code. In step 708, the processing device may update the intercepted transaction message by replacing the fraud-related decline code with a hold code (e.g., by updating the data element comprising the fraud-related decline code, etc.). The transaction message comprising the hold code may be configured to instruct a point of sale device (e.g., merchant point of sale device 104) that a hold is to be placed on processing of a proposed transaction associated with the intercepted transaction message (e.g., originating from the merchant point of sale device).

In step 710, the processing device may generate, based upon detection of the fraud-related decline code, at least one authentication request message, wherein the authentication request message may be transmitted to one or both of a merchant point of sale device (e.g., merchant point of sale device 104) and a user device (e.g., user mobile device 114). The transmitted authentication request may be configured to cause one of or both of merchant point of sale device and user device to display a message requesting user input of authentication data.

In step 712, a transmitting device may transmit, to the point of sale device, via a communications network, the updated electronic transaction message. The transmitting device may, for instance, transmit a data signal superimposed with the transaction message (which may be formatted according to standards discussed herein) to the point of sale device.

In step 714, the transmitting device may transmit, e.g. to at least one of the point of sale device and a user mobile device, the generated (or otherwise identified) authentication request message. The transmitting device may, for instance, transmit a data signal superimposed with the authentication request message (which may be formatted according to standards discussed herein) to the point of sale device.

Figure 8:
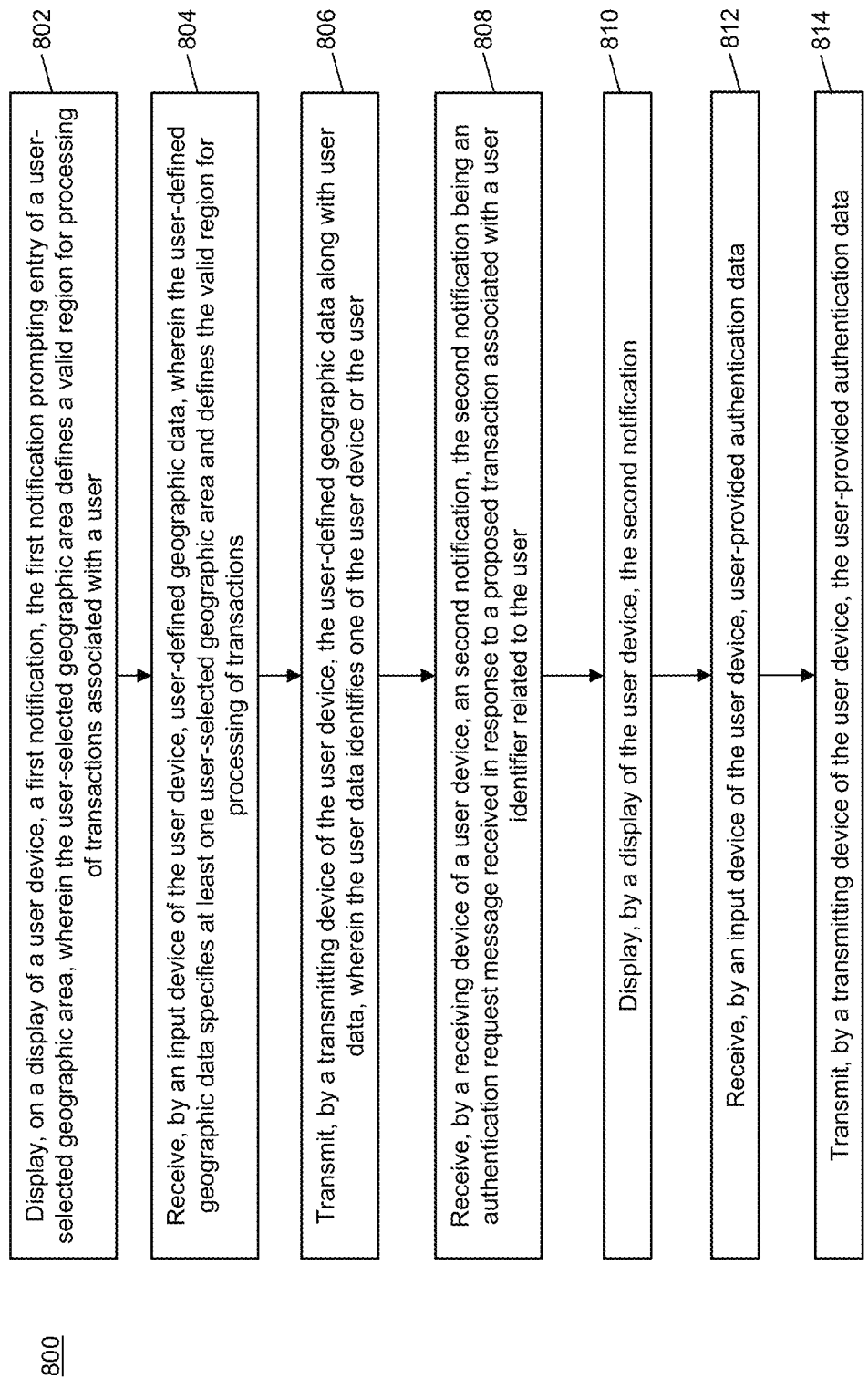
FIG. 8 is a flow diagram illustrating a process for updating a fraudulent activity parameter performed by a user device such as that depicted in FIG. 6A or FIG. 6B in accordance with exemplary embodiments.

Exemplary Method for Identification of User-Defined Geographic Location Parameters FIG. 8 illustrates method 800 for real-time fraudulent activity verification based upon user-defined parameters.

In step 802, a user device may display, on a display thereof, a first notification. The first notification may prompt entry of user-selected geographic area data (e.g., user selection based on user interaction with a map, based upon user-provided longitude/latitude coordinates, based upon an address or series of addresses, based upon a distance from an address, series of addresses, identified travel route, etc.). In step 804, user device may receive, via an input thereof, user-defined geographic data, wherein the user-defined geographic data specifies at least one user-selected geographic area and defines the valid region for processing of transactions (e.g., a touch screen of the user device may receive input provided by a stylus or a user's finger, etc. which may draw or otherwise identify an area on a map display).

In step 806, the user device may transmit, via a transmitting device thereof, a signal superimposed with user-defined geographic data specifying at least one user-selected geographic area and defining a valid region for processing of transactions. The data superimposed on the signal may further include additional transaction controls specifying parameters associated with the valid region (e.g., the time of day, the amount of transactions, the spending limit, the type of merchant, etc. which may be conducted within the valid transaction region).

In step 808, the user device may receive, by a receiving device thereof (e.g., from processing server 110 or fraud engine discussed herein, etc.), a second notification, the second notification being an authentication request message received in response to a proposed transaction associated with a user identifier related to the user (e.g., in accordance with processes described in connection with FIGS. 3A-3C, etc.). The user device may parse the received second notification message to determine the content thereof. In step 810, the user device may display, on a display thereof, the second notification.

In step 812, the user device may receive, via an input device of the user device, which may be, e.g., a touch screen, a keypad, etc., user-provided authentication data, such as that described in connection with embodiments disclosed herein. In step 814, the user device may superimpose the received user-provided authentication data onto a data signal and transmit the data signal, e.g. to a processing server such as processing server 110, to a fraud engine, to an application server in communication with one or more entities of payment network 108, etc.

In some embodiments, a user device may receive, parse, and display a notification in connection with an additional transaction message (e.g., a third transaction message) which indicates that processing of a proposed transaction was (i) denied or (ii) approved (e.g., based upon the transmitted user authentication data, etc.).

In some embodiments, a user device may display an additional notification, e.g. a "geofence update" notification. The geofence update notification may, for instance, prompt user entry of user-defined proposed transaction controls, modifying the definition of the valid region for the processing of transactions. Such controls may, e.g., be similar to those implemented by MasterCard's® inControl™ platform, etc.

A user device upon which the method 800 and other processes described herein may be performed may comprise a location determination circuit, module, or other component which may be configured to determine a geographic location of the mobile device (e.g., a GPS module, an assisted GPS providing location of the mobile device in terms of latitude/longitude coordinates, a module configured to determine WiFi location information and other networks, a module configured to communicate with nearby devices and receive geographic location data therefrom, etc.). Such geographic location determination components which may be implemented within the presently disclosed systems and methods will be apparent to those skilled in the relevant art upon reading the present disclosure.

In some embodiments, a current geographic location of the user device may be transmitted (e.g., as data superimposed on a signal) to a processing server or other entity which may implement the received geographic data in a fraudulent activity identification process (e.g., such as any of the processes described herein).

Figure 9:
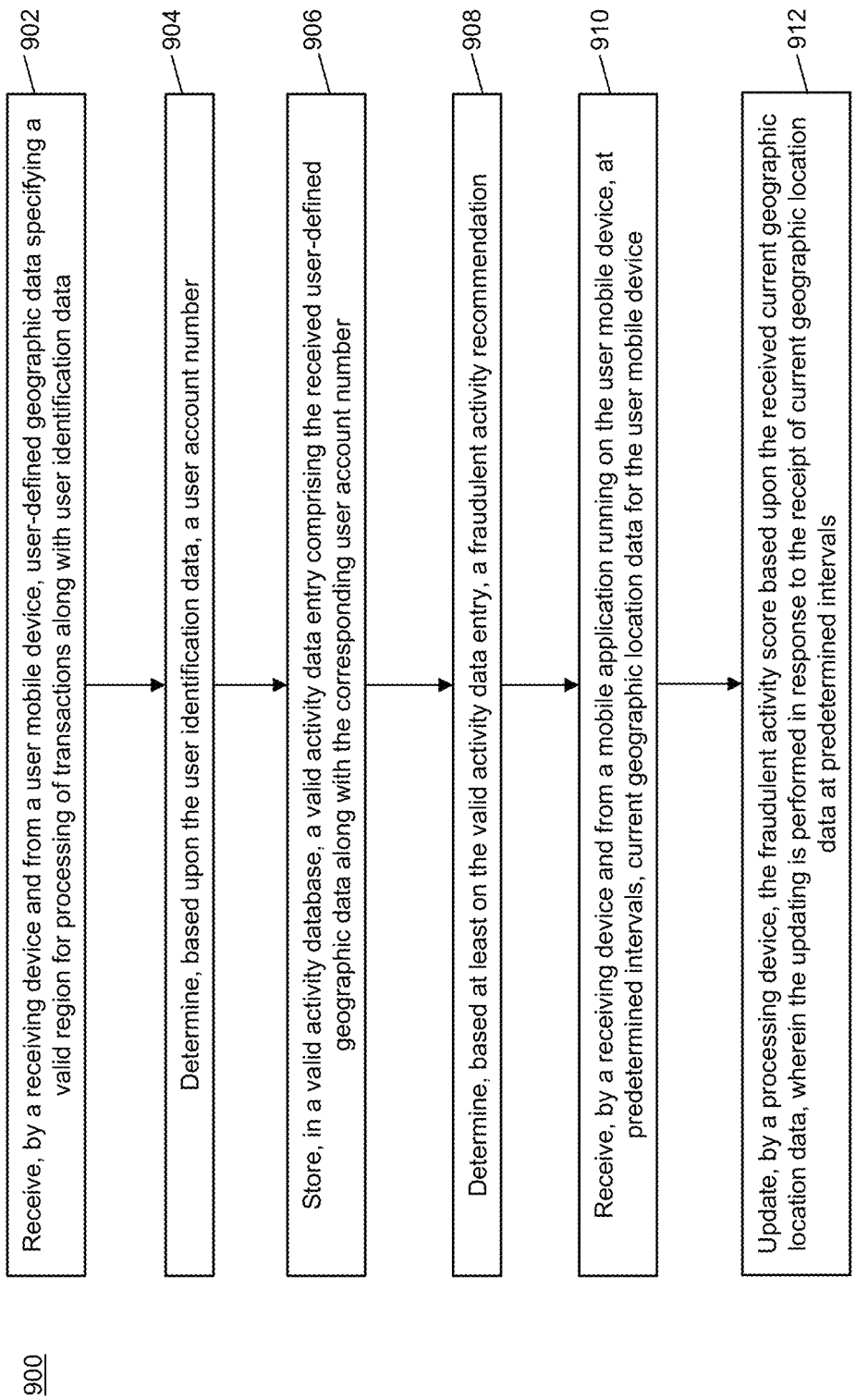
FIG. 9 is a flow diagram illustrating a process for updating a fraudulent activity parameter performed by a processing server such as that depicted in FIG. 2 in accordance with exemplary embodiments.

Exemplary Method for Real-Time Fraudulent Activity Verification Based Upon User-Defined Geographic Location Parameters FIG. 9 illustrates method 900 for real-time fraudulent activity verification based upon user-defined parameters. The Method of FIG. 9 may, e.g., be performed by a processing server such as processing server 110 of FIG. 1.

In step 902, a receiving device may receive, from a user mobile device, user-defined geographic data specifying a valid region for processing of transactions along with user identification data. The data may be received, e.g., via a signal transmitted from the user device superimposed with user-defined location parameters. The data may further comprise additional transaction controls, limiting or modifying valid transaction activity within the user-defined geographic area.

In step 904, a processing device may determine a user account number (e.g., a user payment account number), based upon the received user identification data (e.g., a username associated with a mobile application running on the mobile device form which data is being received, a user identifier registered with a system of a processing server, etc.).

In step 906, a data entry of a valid activity database may be updated or created, the data entry comprising the received user-defined geographic data along with the corresponding user account number. In some embodiments, the data entry may be pre-existing and may be identified by a querying process, such as those described herein, based upon the user account number.

In step 908, a fraudulent activity recommendation may be determined based on the valid activity data entry. For instance, the valid activity data entry may store data identifying whether activity occurring within geographic parameters defined therein (or in accordance with other transaction controls associated with the geographic parameters and/or user account number) should be recommended as fraudulent or valid. In some embodiments, the valid activity data has a default recommendation setting of valid. In some embodiments, the valid activity data has a default recommendation setting of fraudulent. Such a recommendation may be provided, e.g. to a fraud engine for transaction decisioning.

In step 910, a receiving device may receive, e.g., from a mobile application running on the user mobile device, at predetermined intervals, current geographic location data for the user mobile device. In step 912, a processing device may, based upon the received current geographic location data, update the fraudulent activity recommendation. For instance, upon receiving geographic location data, the processing device may query a database for a data entry associated with the geographic location data (e.g., based upon an identifier received in connection with the geographic location data, such as a mobile device identifier, user identifier, application identifier, etc.). The processing device may determine whether the received current geographic location data corresponds to data stored within a valid activity data entry identified by the querying process. If the current geographic location data is within geographic locations identified as valid by valid activity data entry, the data entry may be updated to include a fraudulent activity recommendation (e.g., recommend non-fraudulent).

Payment Transaction Processing System and Process

Figure 10:
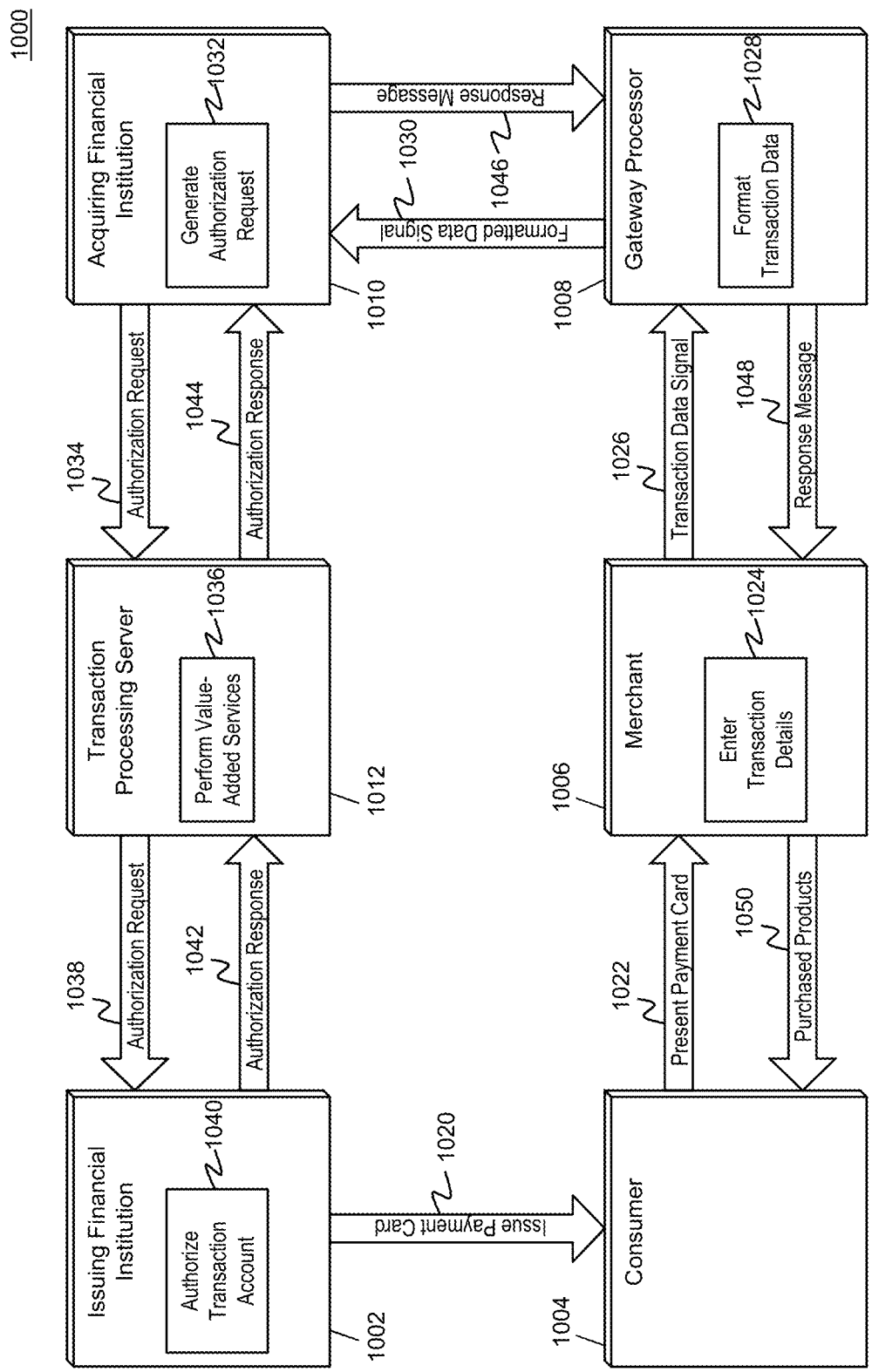
FIG. 10 is a flow diagram illustrating the processing of a payment transaction in accordance with exemplary embodiments.

FIG. 10 is a flow diagram 1000 illustrating the processing of a payment transaction in accordance with exemplary embodiments.

The process 1000 and steps included therein may be performed by one or more components of the system 100 discussed above, such as the processing server 110, merchant point of sale devices 104, payment network 108, etc. The processing of payment transactions using the system and process 1000 illustrated in FIG. 10 and discussed below may utilize the payment rails, which may be comprised of the computing devices and infrastructure utilized to perform the steps of the process 1000 as specially configured and programmed by the entities discussed below, including the transaction processing server 1012, which may be associated with one or more payment networks configured to processing payment transactions. It will be apparent to persons having skill in the relevant art that the process 1000 may be incorporated into the processes illustrated in FIGS. 3, 4 and 7-9 discussed above, with respect to the step or steps involved in the processing of a payment transaction. In addition, the entities discussed herein for performing the process 1000 may include one or more computing devices or systems configured to perform the functions discussed below. For instance, the merchant 1006 may be comprised of one or more point of sale devices, a local communication network, a computing server, and other devices configured to perform the functions discussed below.

In step 1020, an issuing financial institution 1002 may issue a payment card or other suitable payment instrument to a consumer 1004. The issuing financial institution may be a financial institution, such as a bank, or other suitable type of entity that administers and manages payment accounts and/or payment instruments for use with payment accounts that can be used to fund payment transactions. The consumer 1004 may have a transaction account with the issuing financial institution 1002 for which the issued payment card is associated, such that, when used in a payment transaction, the payment transaction is funded by the associated transaction account. In some embodiments, the payment card may be issued to the consumer 1004 physically. In other embodiments, the payment card may be a virtual payment card or otherwise provisioned to the consumer 1004 in an electronic format.

In step 1022, the consumer 1004 may present the issued payment card to a merchant 1006 for use in funding a payment transaction. The merchant 1006 may be a business, another consumer, or any entity that may engage in a payment transaction with the consumer 1004. The payment card may be presented by the consumer 1004 via providing the physical card to the merchant 1006, electronically transmitting (e.g., via near field communication, wireless transmission, or other suitable electronic transmission type and protocol) payment details for the payment card, or initiating transmission of payment details to the merchant 1006 via a third party. The merchant 1006 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 1024, the merchant 1006 may enter transaction details into a point of sale computing system. The transaction details may include the payment details provided by the consumer 1004 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 1006 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 1006 may be an online retailer in an e-commerce transaction. In such embodiments, the transaction details may be entered in a shopping cart or other repository for storing transaction data in an electronic transaction as will be apparent to persons having skill in the relevant art.

In step 1026, the merchant 1006 may electronically transmit a data signal superimposed with transaction data to a gateway processor 1008. The gateway processor 1008 may be an entity configured to receive transaction details from a merchant 1006 for formatting and transmission to an acquiring financial institution 1010. In some instances, a gateway processor 1008 may be associated with a plurality of merchants 1006 and a plurality of acquiring financial institutions 1010. In such instances, the gateway processor 1008 may receive transaction details for a plurality of different transactions involving various merchants, which may be forwarded on to appropriate acquiring financial institutions 1010. By having relationships with multiple acquiring financial institutions 1010 and having the requisite infrastructure to communicate with financial institutions using the payment rails, such as using application programming interfaces associated with the gateway processor 1008 or financial institutions used for the submission, receipt, and retrieval of data, a gateway processor 1008 may act as an intermediary for a merchant 1006 to be able to conduct payment transactions via a single communication channel and format with the gateway processor 1008, without having to maintain relationships with multiple acquiring financial institutions 1010 and payment processors and the hardware associated thereto. Acquiring financial institutions 1010 may be financial institutions, such as banks, or other entities that administers and manages payment accounts and/or payment instruments for use with payment accounts. In some instances, acquiring financial institutions 1010 may manage transaction accounts for merchants 1006. In some cases, a single financial institution may operate as both an issuing financial institution 1002 and an acquiring financial institution 1010.

The data signal transmitted from the merchant 1006 to the gateway processor 1008 may be superimposed with the transaction details for the payment transaction, which may be formatted based on one or more standards. In some embodiments, the standards may be set forth by the gateway processor 1008, which may use a unique, proprietary format for the transmission of transaction data to/from the gateway processor 1008. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 1008.

In step 1028, the gateway processor 1008 may parse the transaction data signal to obtain the transaction data superimposed thereon and may format the transaction data as necessary. The formatting of the transaction data may be performed by the gateway processor 1008 based on the proprietary standards of the gateway processor 1008 or an acquiring financial institution 1010 associated with the payment transaction. The proprietary standards may specify the type of data included in the transaction data and the format for storage and transmission of the data. The acquiring financial institution 1010 may be identified by the gateway processor 1008 using the transaction data, such as by parsing the transaction data (e.g., deconstructing into data elements) to obtain an account identifier included therein associated with the acquiring financial institution 1010. In some instances, the gateway processor 1008 may then format the transaction data based on the identified acquiring financial institution 1010, such as to comply with standards of formatting specified by the acquiring financial institution 1010. In some embodiments, the identified acquiring financial institution 1010 may be associated with the merchant 1006 involved in the payment transaction, and, in some cases, may manage a transaction account associated with the merchant 1006.

In step 1030, the gateway processor 1008 may electronically transmit a data signal superimposed with the formatted transaction data to the identified acquiring financial institution 1010. The acquiring financial institution 1010 may receive the data signal and parse the signal to obtain the formatted transaction data superimposed thereon. In step 1032, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 1006 involved in the payment transaction is requesting payment or a promise of payment from the issuing financial institution 1002 for the transaction. The authorization request may include a plurality of data elements, each data element being configured to store data as set forth in the associated standards, such as for storing an account number, application cryptogram, transaction amount, issuing financial institution 1002 information, etc.

In step 1034, the acquiring financial institution 1010 may electronically transmit the authorization request to a transaction processing server 1012 for processing. The transaction processing server 1012 may be comprised of one or more computing devices as part of a payment network configured to process payment transactions. In some embodiments, the authorization request may be transmitted by a transaction processor at the acquiring financial institution 1010 or other entity associated with the acquiring financial institution. The transaction processor may be one or more computing devices that include a plurality of communication channels for communication with the transaction processing server 1012 for the transmission of transaction messages and other data to and from the transaction processing server 1012. In some embodiments, the payment network associated with the transaction processing server 1012 may own or operate each transaction processor such that the payment network may maintain control over the communication of transaction messages to and from the transaction processing server 1012 for network and informational security.

In step 1036, the transaction processing server 1012 may perform value-added services for the payment transaction. Value-added services may be services specified by the issuing financial institution 1002 that may provide additional value to the issuing financial institution 1002 or the consumer 1004 in the processing of payment transactions. Value-added services may include, for example, fraud scoring, transaction or account controls, account number mapping, offer redemption, loyalty processing, etc. For instance, when the transaction processing server 1012 receives the transaction, a fraud score for the transaction may be calculated based on the data included therein and one or more fraud scoring algorithms and/or engines. In some instances, the transaction processing server 1012 may first identify the issuing financial institution 1002 associated with the transaction, and then identify any services indicated by the issuing financial institution 1002 to be performed. The issuing financial institution 1002 may be identified, for example, by data included in a specific data element included in the authorization request, such as an issuer identification number. In another example, the issuing financial institution 1002 may be identified by the primary account number stored in the authorization request, such as by using a portion of the primary account number (e.g., a bank identification number) for identification.

In step 1038, the transaction processing server 1012 may electronically transmit the authorization request to the issuing financial institution 1002. In some instances, the authorization request may be modified, or additional data included in or transmitted accompanying the authorization request as a result of the performance of value-added services by the transaction processing server 1012. In some embodiments, the authorization request may be transmitted to a transaction processor (e.g., owned or operated by the transaction processing server 1012) situated at the issuing financial institution 1002 or an entity associated thereof, which may forward the authorization request to the issuing financial institution 1002.

In step 1040, the issuing financial institution 1002 may authorize the transaction account for payment of the payment transaction. The authorization may be based on an available credit amount for the transaction account and the transaction amount for the payment transaction, fraud scores provided by the transaction processing server 1012, and other considerations that will be apparent to persons having skill in the relevant art. The issuing financial institution 1002 may modify the authorization request to include a response code indicating approval (e.g., or denial if the transaction is to be denied) of the payment transaction. The issuing financial institution 1002 may also modify a message type indicator for the transaction message to indicate that the transaction message is changed to be an authorization response. In step 1042, the issuing financial institution 1002 may transmit (e.g., via a transaction processor) the authorization response to the transaction processing server 1012.

In step 1044, the transaction processing server 1012 may forward the authorization response to the acquiring financial institution 1010 (e.g., via a transaction processor). In step 1046, the acquiring financial institution may generate a response message indicating approval or denial of the payment transaction as indicated in the response code of the authorization response, and may transmit the response message to the gateway processor 1008 using the standards and protocols set forth by the gateway processor 1008. In step 1048, the gateway processor 1008 may forward the response message to the merchant 1006 using the appropriate standards and protocols. In step 1070, the merchant 1006 may then provide the products purchased by the consumer 1004 as part of the payment transaction to the consumer 1004.

In some embodiments, once the process 1000 has completed, payment from the issuing financial institution 1002 to the acquiring financial institution 1010 may be performed. In some instances, the payment may be made immediately or within one business day. In other instances, the payment may be made after a period of time, and in response to the submission of a clearing request from the acquiring financial institution 1010 to the issuing financial institution 1002 via the transaction processing server 1002. In such instances, clearing requests for multiple payment transactions may be aggregated into a single clearing request, which may be used by the transaction processing server 1012 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 1040), the transaction processing server 1012 may be configured to perform authorization of transactions on behalf of the issuing financial institution 1002. Such actions may be referred to as "stand-in processing," where the transaction processing server "stands in" as the issuing financial institution 1002. In such instances, the transaction processing server 1012 may utilize rules set forth by the issuing financial institution 1002 to determine approval or denial of the payment transaction, and may modify the transaction message accordingly prior to forwarding to the acquiring financial institution 1010 in step 1044. The transaction processing server 1012 may retain data associated with transactions for which the transaction processing server 1012 stands in, and may transmit the retained data to the issuing financial institution 1002 once communication is reestablished. The issuing financial institution 1002 may then process transaction accounts accordingly to accommodate for the time of lost communication.

In another example, if the transaction processing server 1012 is unavailable for submission of the authorization request by the acquiring financial institution 1010, then the transaction processor at the acquiring financial institution 1010 may be configured to perform the processing of the transaction processing server 1012 and the issuing financial institution 1002. The transaction processor may include rules and data suitable for use in making a determination of approval or denial of the payment transaction based on the data included therein. For instance, the issuing financial institution 1002 and/or transaction processing server 1012 may set limits on transaction type, transaction amount, etc. that may be stored in the transaction processor and used to determine approval or denial of a payment transaction based thereon. In such instances, the acquiring financial institution 1010 may receive an authorization response for the payment transaction even if the transaction processing server 1012 is unavailable, ensuring that transactions are processed and no downtime is experienced even in instances where communication is unavailable. In such cases, the transaction processor may store transaction details for the payment transactions, which may be transmitted to the transaction processing server 1012 (e.g., and from there to the associated issuing financial institutions 1002) once communication is reestablished.

In some embodiments, transaction processors may be configured to include a plurality of different communication channels, which may utilize multiple communication cards and/or devices, to communicate with the transaction processing server 1012 for the sending and receiving of transaction messages. For example, a transaction processor may be comprised of multiple computing devices, each having multiple communication ports that are connected to the transaction processing server 1012. In such embodiments, the transaction processor may cycle through the communication channels when transmitting transaction messages to the transaction processing server 1012, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 1010 may identify that an authorization request involves an issuing financial institution 1002 (e.g., via the bank identification number included in the transaction message) for which no value-added services are required. The transaction processor at the acquiring financial institution 1010 may then transmit the authorization request directly to the transaction processor at the issuing financial institution 1002 (e.g., without the authorization request passing through the transaction processing server 1012), where the issuing financial institution 1002 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 1012 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 1008, acquiring financial institution 1010, etc.) for processing using this advanced network, and to quickly and efficiently receive a response regarding the ability for a consumer 1004 to fund the payment transaction.

Computer System Architecture

Figure 11:
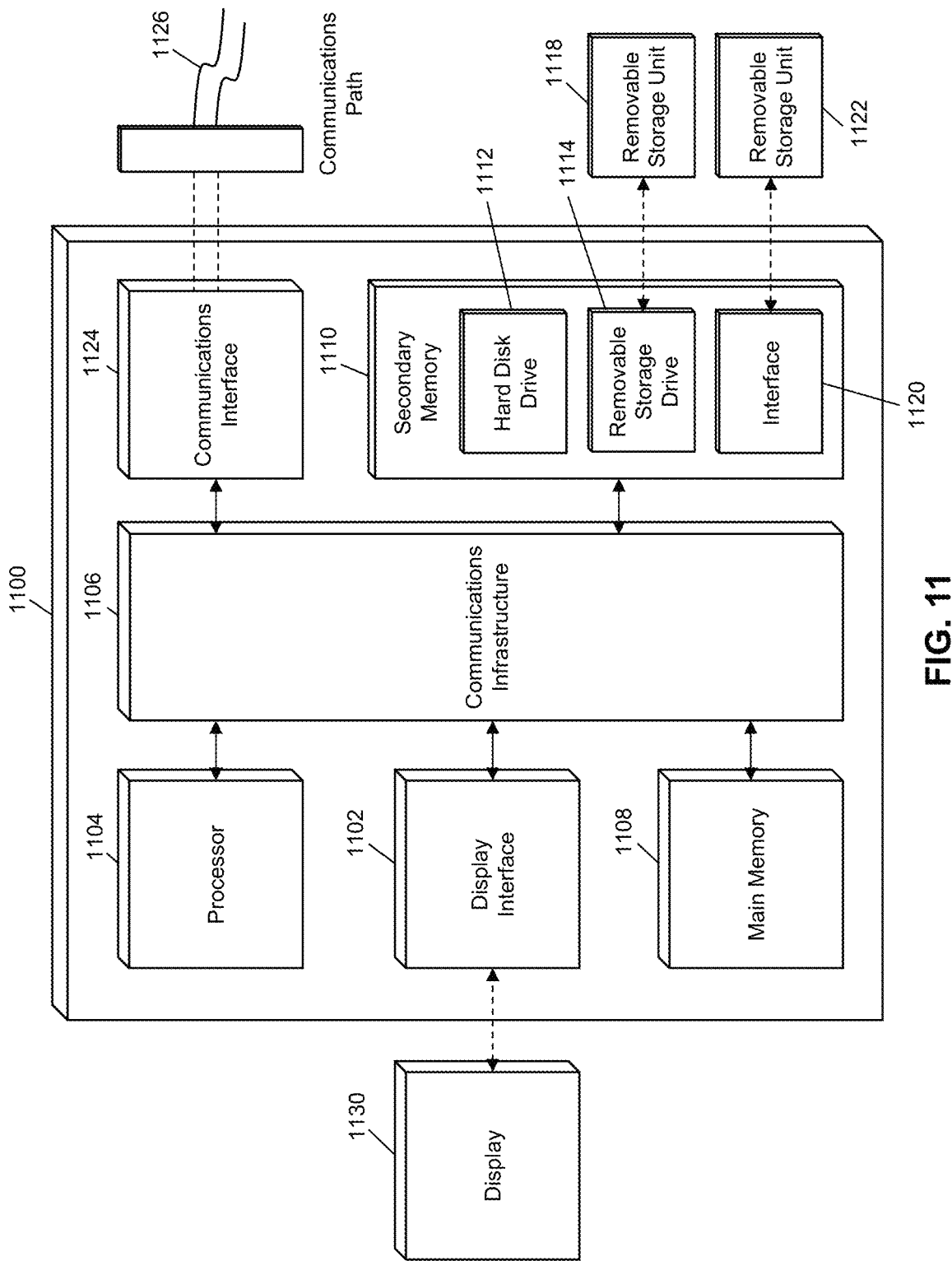
FIG. 11 is a block diagram illustrating a computer system architecture in accordance with exemplary embodiments.

FIG. 11 is a block diagram 1100 illustrating a computer system architecture in accordance with exemplary embodiments. For example, the processing server 110 of FIG. 1 may be implemented in the computer system 1100 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 4 and 7-9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1118, a removable storage unit 1122, and a hard disk installed in hard disk drive 1112.

Various embodiments of the present disclosure are described in terms of this example computer system 1100. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1104 may be a special purpose or a general purpose processor device specifically configured to perform the functions discussed herein. The processor device 1104 may be connected to a communications infrastructure 1106, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1100 may also include a main memory 1108 (e.g., random access memory, read-only memory, etc.), and may also include a secondary memory 1110. The secondary memory 1110 may include the hard disk drive 1112 and a removable storage drive 1114, such as a floppy disk drive, a magnetic tape drive, an optical disk drive, a flash memory, etc.

The removable storage drive 1114 may read from and/or write to the removable storage unit 1118 in a well-known manner. The removable storage unit 1118 may include a removable storage media that may be read by and written to by the removable storage drive 1114. For example, if the removable storage drive 1114 is a floppy disk drive or universal serial bus port, the removable storage unit 1118 may be a floppy disk or portable flash drive, respectively. In one embodiment, the removable storage unit 1118 may be non-transitory computer readable recording media.

In some embodiments, the secondary memory 1110 may include alternative means for allowing computer programs or other instructions to be loaded into the computer system 1100, for example, the removable storage unit 1122 and an interface 1120. Examples of such means may include a program cartridge and cartridge interface (e.g., as found in video game systems), a removable memory chip (e.g., EEPROM, PROM, etc.) and associated socket, and other removable storage units 1122 and interfaces 1120 as will be apparent to persons having skill in the relevant art.

Data stored in the computer system 1100 (e.g., in the main memory 1108 and/or the secondary memory 1110) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1100 may also include a communications interface 1124. The communications interface 1124 may be configured to allow software and data to be transferred between the computer system 1100 and external devices. Exemplary communications interfaces 1124 may include a modem, a network interface (e.g., an Ethernet card), a communications port, a PCMCIA slot and card, etc. Software and data transferred via the communications interface 1124 may be in the form of signals, which may be electronic, electromagnetic, optical, or other signals as will be apparent to persons having skill in the relevant art. The signals may travel via a communications path 1126, which may be configured to carry the signals and may be implemented using wire, cable, fiber optics, a phone line, a cellular phone link, a radio frequency link, etc.

The computer system 1100 may further include a display interface 1102. The display interface 1102 may be configured to allow data to be transferred between the computer system 1100 and external display 1130. Exemplary display interfaces 1102 may include high-definition multimedia interface (HDMI), digital visual interface (DVI), video graphics array (VGA), etc. The display 1130 may be any suitable type of display for displaying data transmitted via the display interface 1102 of the computer system 1100, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1108 and secondary memory 1110, which may be memory semiconductors (e.g., DRAMs, etc.). These computer program products may be means for providing software to the computer system 1100. Computer programs (e.g., computer control logic) may be stored in the main memory 1108 and/or the secondary memory 1110. Computer programs may also be received via the communications interface 1124. Such computer programs, when executed, may enable computer system 1100 to implement the present methods as discussed herein. In particular, the computer programs, when executed, may enable processor device 1104 to implement the methods illustrated by FIGS. 3, 4 and 7-9, as discussed herein. Accordingly, such computer programs may represent controllers of the computer system 1100. Where the present disclosure is implemented using software, the software may be stored in a computer program product and loaded into the computer system 1100 using the removable storage drive 1114, interface 1120, and hard disk drive 1112, or communications interface 1124.

The processor device 1104 may comprise one or more modules or engines configured to perform the functions of the computer system 1100. Each of the modules or engines may be implemented using hardware and, in some instances, may also utilize software, such as corresponding to program code and/or programs stored in the main memory 1108 or secondary memory 1110. In such instances, program code may be compiled by the processor device 1104 (e.g., by a compiling module or engine) prior to execution by the hardware of the computer system 1100. For example, the program code may be source code written in a programming language that is translated into a lower level language, such as assembly language or machine code, for execution by the processor device 1104 and/or any additional hardware components of the computer system 1100. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1100 to perform the functions disclosed herein. It will be apparent to persons having skill in the relevant art that such processes result in the computer system 1100 being a specially configured computer system 1100 uniquely programmed to perform the functions discussed above.

Techniques consistent with the present disclosure provide, among other features, systems and methods for generating and using indexing models for neighborhood growth. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A computer-implemented method for user-defined fraudulent activity determination, comprising:
   receiving, by a receiving device of the processing server, from a user mobile device, user identification data and user-defined geographic data associated with a geofence, said user-defined geographic data specifying a valid region for processing of transactions, wherein said user mobile device creates the geofence based upon a user-defined geographic area that defines an area of valid account activity;
   determining, by a processing device of the processing server, based upon the user identification data, a user account number;
   storing, in a valid activity database of the processing server, a valid activity data entry comprising the received user-defined geographic data along with the corresponding user account number; and
   determining, by the processing device of the processing server, based at least on the valid activity data entry, a fraudulent activity recommendation,
   wherein a user mobile application, installed on the user mobile device, detects instances of entrances of the user mobile device into and exits from the area of valid account activity defined by the created geofence and transmits, to the processing server, a location of the user mobile device at a detected instance, and
   wherein the computer-implemented method further comprises:
   in response to receiving the location of the user mobile device at the detected instance from the mobile device application, running on the user mobile device, updating, by a processing device of the processing server, the fraudulent activity recommendation based upon the location of the user mobile device at the detected instance.

2. The method of claim 1, further comprising:
   providing, to an input of a fraud engine, the fraudulent activity recommendation and corresponding user account number.

3. The method of claim 1, wherein the user-defined geographic area data is a selected route along with additional validity data, wherein the additional validity data is a specified distance from the route.

4. A system for user-defined fraudulent activity determination, comprising:
   a user mobile device configured to create a geofence based upon a user-defined geographic area that defines an area of valid account activity;
   a receiving device, of a processing server, configured to receive, from the user mobile device, user identification data and user-defined geographic data associated with the geofence created by the user mobile device, said user-defined geographic data specifying a valid region for processing of transactions; and a processing device, of the processing server, configured to:

determine, based upon the user identification data, a user account number, store, in a valid activity database, a valid activity data entry comprising the received user-defined geographic data along with the corresponding user account number, and determine, based at least on the valid activity data entry, a fraudulent activity recommendation, wherein a user mobile application, installed on the user mobile device, detects instances of entrances of the user mobile device into and exits from the area of valid account activity defined by the created geofence and transmits the location of the user mobile device at a detected instance to the processing server, in response to receiving the location of the user mobile device at the detected instance from the mobile device application, running on the user mobile device, the processing device, of the processing server, is further configured to update the fraudulent activity recommendation based upon the location of the user mobile device at the detected instance.

5. The system of claim 4, wherein the processing device is further configured to provide, to an input of a fraud engine, the fraudulent activity recommendation and corresponding user account number.

6. The system of claim 4, wherein the user-defined geographic area data is a selected route along with additional validity data, wherein the additional validity data is a specified distance from the route.

* * * * *